(12) United States Patent
Low

(10) Patent No.: US 12,018,203 B2
(45) Date of Patent: *Jun. 25, 2024

(54) HEAT TRANSFER COMPOSITIONS

(71) Applicant: Mexichem Fluor S.A. de C.V., San Luis Potosi (MX)

(72) Inventor: Robert Low, Runcorn (GB)

(73) Assignee: MEXICHEM FLUOR S.A. DE C.V., San Luis Potosi (MX)

( * ) Notice: Subject to any disclaimer, the term of this patent is extended or adjusted under 35 U.S.C. 154(b) by 155 days.

This patent is subject to a terminal disclaimer.

(21) Appl. No.: 17/429,086

(22) PCT Filed: Feb. 11, 2020

(86) PCT No.: PCT/GB2020/050306
§ 371 (c)(1),
(2) Date: Aug. 6, 2021

(87) PCT Pub. No.: WO2020/165569
PCT Pub. Date: Aug. 20, 2020

(65) Prior Publication Data
US 2022/0127507 A1    Apr. 28, 2022

(30) Foreign Application Priority Data

Feb. 11, 2019 (GB) .................................... 1901885
Feb. 11, 2019 (GB) .................................... 1901890
Aug. 14, 2019 (WO) ................ PCT/GB2019/052290

(51) Int. Cl.
| | |
|---|---|
| C09K 5/04 | (2006.01) |
| B01D 11/02 | (2006.01) |
| C09K 3/30 | (2006.01) |
| C10M 105/38 | (2006.01) |
| C11D 7/04 | (2006.01) |
| C11D 7/24 | (2006.01) |
| C11D 7/30 | (2006.01) |
| C11D 7/50 | (2006.01) |
| F25B 45/00 | (2006.01) |
| C10N 40/30 | (2006.01) |

(52) U.S. Cl.
CPC .......... *C09K 5/045* (2013.01); *B01D 11/0288* (2013.01); *C09K 3/30* (2013.01); *C10M 105/38* (2013.01); *C11D 7/04* (2013.01); *C11D 7/241* (2013.01); *C11D 7/30* (2013.01); *C11D 7/5018* (2013.01); *F25B 45/00* (2013.01); *C09K 2205/106* (2013.01); *C09K 2205/122* (2013.01); *C09K 2205/126* (2013.01); *C09K 2205/40* (2013.01); *C10M 2207/2835* (2013.01); *C10N 2040/30* (2013.01)

(58) Field of Classification Search
CPC .... C09K 5/045; C09K 3/30; C09K 2205/106; C09K 2205/122; C09K 2205/126; C09K 2205/40; C09K 3/00; C09K 5/04; C09K 5/041; C09K 5/044; C09K 5/048; C09K 23/007; C09K 23/017; C09K 2205/12; B01D 11/0288; B01D 11/02288; C10M 105/38; C10M 2207/2835; C10M 2040/30; C11D 7/04; C11D 7/241; C11D 7/30; C11D 7/5018; C11D 7/20; F25B 45/00; C10N 2040/30; C08J 9/122; C08J 9/127; C08J 9/143; C08J 9/144; C08J 9/146; C08J 9/149; C08J 2203/06; C08J 2203/14; C08J 2203/142; C08J 2203/16; C08J 2203/162; C08J 2203/202; H01B 3/56; A62D 1/0028; A62D 1/005; A62D 1/0057; A62D 1/0092
USPC ........................ 252/67, 68, 69; 62/467, 529
See application file for complete search history.

(56) References Cited

U.S. PATENT DOCUMENTS

| | | | | |
|---|---|---|---|---|
| 8,080,185 | B2 * | 12/2011 | Luly | ................. H01B 3/56 |
| | | | | 252/573 |
| 11,136,482 | B2 * | 10/2021 | Low | .................. C09K 3/30 |
| 11,434,402 | B2 * | 9/2022 | Aydin | .................. F25B 9/008 |
| 11,679,291 | B2 * | 6/2023 | Robin | ................. A62D 1/0057 |
| | | | | 252/3 |

(Continued)

FOREIGN PATENT DOCUMENTS

| | | | |
|---|---|---|---|
| EP | 3 109 292 A1 | 12/2016 | |
| EP | 3 825 381 A1 | 5/2021 | |

(Continued)

OTHER PUBLICATIONS

Examination Report for corresponding European patent application 20705250.7 dated Nov. 25, 2022, 5 pgs.

(Continued)

*Primary Examiner* — Matthew R Diaz
(74) *Attorney, Agent, or Firm* — Crowell & Moring LLP

(57) ABSTRACT

According to the present invention, there is provided a composition comprising 1,1-difluoroethylene (R-1132a), difluoromethane (R-32), 2,3,3,3-tetrafluoropropene (R-1234yf) and carbo dioxide ($CO_2$, R-744). The invention also provides a composition R-1132a, R-32, R-1234yf and at least one compound selected from the group consisting of: pentafluoroethane (R-125), 1,1-difluoroethane (R-152a), 1,1,1,2-tetrafluoroethane (R-134a), trans-1,3,3,3-tetrafluoropropene (R-1234ze(E)) and 1,1,1,2,3,3,3-heptafluoropropane (R-227ea); optionally, the composition comprises at least one further compound selected from the group consisting of trifluoroethylene (R-1123), propane (R-290), propylene (R-1270), isobutane (R-600a) and carbon dioxide ($CO_2$, R-744). The present invention also provides a composition comprising R-1132a, R-32 and R-1234yf.

56 Claims, No Drawings

(56) References Cited

U.S. PATENT DOCUMENTS

| | | | |
|---|---|---|---|
| 11,692,115 B2* | 7/2023 | Low | C09K 3/30 |
| | | | 252/68 |
| 2015/0376486 A1 | 12/2015 | Hashimoto et al. | |
| 2016/0002518 A1 | 1/2016 | Taniguchi et al. | |
| 2016/0017110 A1* | 1/2016 | Singh | C08J 9/146 |
| | | | 521/146 |
| 2016/0097569 A1* | 4/2016 | Matsunaga | F04C 23/008 |
| | | | 62/324.6 |
| 2016/0178246 A1* | 6/2016 | Toyooka | F25B 9/008 |
| | | | 62/502 |
| 2016/0332937 A1* | 11/2016 | Nakamura | C07C 17/25 |
| 2016/0340565 A1 | 11/2016 | Tasaka et al. | |
| 2017/0018982 A1* | 1/2017 | Ono | F04C 29/0085 |
| 2017/0335159 A1 | 11/2017 | Fukushima et al. | |
| 2018/0355269 A1* | 12/2018 | Low | C09K 21/02 |
| 2018/0362441 A1* | 12/2018 | Low | C07C 69/63 |
| 2020/0283667 A1* | 9/2020 | Aydin | F25B 9/008 |
| 2021/0261840 A1* | 8/2021 | Low | B60H 1/00392 |
| 2021/0403777 A1* | 12/2021 | Low | C11D 11/0041 |

FOREIGN PATENT DOCUMENTS

| | | | | |
|---|---|---|---|---|
| WO | WO 2015/006258 A1 | 1/2015 | | |
| WO | WO 2016/190177 A1 | 12/2016 | | |
| WO | WO 2017/098238 A1 | 6/2017 | | |
| WO | WO-2017098234 A1 * | 6/2017 | | C07C 69/63 |
| WO | WO-2017098238 A1 * | 6/2017 | | C09K 21/02 |
| WO | WO-2017141322 A1 * | 8/2017 | | F04B 39/02 |
| WO | WO 2018/232394 A1 | 12/2018 | | |
| WO | WO 2019/030508 A1 | 2/2019 | | |
| WO | WO-2019030841 A1 * | 2/2019 | | F04B 39/00 |
| WO | WO 2020/017522 A1 | 1/2020 | | |
| WO | WO-2020017386 A1 * | 1/2020 | | C09K 5/045 |
| WO | WO 2020/035690 A1 | 2/2020 | | |

OTHER PUBLICATIONS

Examination Report for corresponding Indian patent application 202127040583 dated Feb. 7, 2023, 6 pgs.

Examination Report under Section 18(3) of Great Britain application 1901885.2 dated Jan. 22, 2020, 2 pages.

International Search Report of PCT Application PCT/GB2019/082290 dated Nov. 6, 2019, 4 pages.

Search Report under Section 17 for Great Britain application 1901885.2 dated Jul. 31, 2019, 1 pages.

International Search Report for corresponding International application No. PCT/GB2020/050306, dated May 6, 2020.

Written Opinion of the International Searching Authority for corresponding International application No. PCT/GB2020/050306, dated May 6, 2020.

* cited by examiner

HEAT TRANSFER COMPOSITIONS

CROSS-REFERENCE TO RELATED APPLICATIONS

This application is the U.S. National Stage application of PCT application no. PCT/GB2020/050306, filed on Feb. 11, 2020, titled COMPOSITIONS, designating the United States, which claims priority to PCT application no. PCT/GB2019/052290, filed Aug. 14, 2019, and which claims priority to Great Britain application no. 1901885.2, filed on Feb. 11, 2019, and which claims priority to Great Britain application no. 1901890.2, filed on Feb. 11, 2019, the contents of which are each incorporated herein by reference in their entirety.

The invention relates to compositions, preferably to heat transfer compositions which may be suitable as replacements for existing refrigerants such as R-410A.

The listing or discussion of a prior-published document or any background in the specification should not necessarily be taken as an acknowledgement that a document or background is part of the state of the art or is common general knowledge.

Mechanical refrigeration systems and related heat transfer devices such as heat pumps and air-conditioning systems are well known. In such systems, a refrigerant liquid evaporates at low pressure taking heat from the surrounding zone. The resulting vapour is then compressed and passed to a condenser where it condenses and gives off heat to a second zone, the condensate being returned through an expansion valve to the evaporator, so completing the cycle. Mechanical energy required for compressing the vapour and pumping the liquid is provided by, for example, an electric motor or an internal combustion engine.

Residential and light commercial air-conditioning and heat pump units are commonly charged with the non-flammable refrigerant R-410A, a mixture of R-32 (difluoromethane) and R-125 (pentafluoroethane). Although the use of this refrigerant results in high system efficiency and hence low energy consumption, the greenhouse (or global) warming potential (GWP) of R-410A is high (2107, using the IPCC AR4 data set).

R-32 (difluoromethane) has been proposed as an alternative to R-410A. R-32 is classed as mildly flammable ("2L" using the ASHRAE classification system). It offers comparable energy efficiency to R-410A in appropriately designed equipment and has a GWP of 675. However, R-32 has a number of disadvantages: its compressor discharge temperatures are significantly higher than R-410A and its operating pressures can also be higher than for R-410A. Compensating for these higher discharge temperatures, by for example using "demand cooling" or liquid injection technologies is possible. These can however reduce the capacity and energy efficiency of the system. A further disadvantage of R-32 is that its GWP (675) is still high when compared to the GWPs of hydrofluoro-olefin refrigerants such as tetrafluoropropenes or hydrocarbons such as propane.

Binary blends of R-32 with R-1234yf (2,3,3,3-tetrafluoropropene) or R-1234ze(E) (E-1,3,3,3-tetrafluoropropene) and ternary blends of R-32, tetrafluoropropenes (either R-1234ze(E) or R-1234yf) and a third component have also been proposed as alternative fluids. Examples of such fluids include R-454B, which is a binary mixture of R-32/R-1234yf (68.9%/31.1%) with a GWP of 466, and R-452B, a ternary mixture of R-32/R-125/R-1234yf (67%/7%/26%) with a GWP of 698. These fluids have reduced GWP compared to R-410A and can offer reduced discharge temperature. However, their GWP values are similar to R-32 and still high when compared to the GWPs of hydrofluoro-olefin refrigerants or hydrocarbons.

In looking for alternative low temperature refrigerants, several other factors must also be considered. Firstly, if the fluid is to be used as a retrofit or conversion fluid in existing equipment, or as a "drop-in" to new equipment using an essentially unchanged R-410A system design, then non-flammability is highly desired, as the existing design will have been based on the use of non-flammable fluid.

If an alternative fluid is to be employed in a wholly new system design, then a degree of flammability may be tolerable, but the use of highly flammable fluids may impose cost and performance penalties to mitigate hazards. Acceptable charge size (refrigerant mass) in a system is also governed by the flammability classification of the fluid, with class 3 fluids, such as ethane, being the most strictly limited. In this case a weaker flammability characteristic is highly desirable since it may allow larger system charges.

Thirdly, the typical application of such fluids is in residual or commercial air-conditioning and heat pump units, which are usually located in buildings. It is therefore desirable to have acceptably low toxicity as a characteristic of the fluid.

Furthermore, the volumetric capacity (a measure of the cooling power achievable by a given size of compressor) and energy efficiency are important.

Thus, there is a need to provide alternative refrigerants having improved properties such as low GWP (so as to reduce the environmental impact of refrigerant leakage), yet possessing acceptable refrigeration performance, flammability characteristics and toxicology. There is also a need to provide alternative refrigerants that may be used in existing devices such as refrigeration devices with little or no modification.

More specifically, it would be advantageous to find refrigerant blends having comparable performance (capacity and energy efficiency, expressed as COP) to R-410A with compressor discharge temperature comparable to that of R-452B or R-454A but with a GWP significantly lower than that of R-32. As R-32 and R-454B are both considered weakly flammable blends (flammability class "2L" according to ASHRAE Standard 34), it would also be desirable that such lower-GWP blends would be of flammability class 2L.

The subject invention addresses the above and other deficiencies, and the above needs, by the provision of a composition comprising 1,1-difluoroethylene (R-1132a), difluoromethane (R-32), 2,3,3,3-tetrafluoropropene (1234yf) and at least one compound selected from the group consisting of: pentafluoroethane (R-125), 1,1-difluoroethane (R-152a), 1,1,1,2-tetrafluoroethane (R-134a), trans-1,3,3,3-tetrafluoropropene (R-1234ze(E)) and 1,1,1,2,3,3,3-heptafluoropropane (R-227ea). Optionally, the composition comprises at least one further compound selected from the group consisting of trifluoroethylene (R-1123), propane (R-290), propylene (R-1270), isobutane (R-600a) and carbon dioxide ($CO_2$, R-744).

Such compositions are referred to hereinafter as compositions of the invention.

The compositions of the invention typically contain from about 1 or 2 or 3 or 4 to about 60% by weight R-1132a. Advantageously, such compositions comprise from about 1 or 2 or 3 or 4 to about 50% by weight R-1132a, such as from about 1 or 2 or 3 or 4 to about 40% by weight R-1132a, for example from about 1 or 2 or 3 or 4 to about 30% by weight R-1132a. Conveniently, the compositions of the invention comprise from about 1 or 2 or 3 or 4 to about 25% by weight R-1132a, such as from 2 to about 20% by weight R-1132a, for example 3 or 4 to about 20% by weight R-1132a. Preferably, such compositions comprise from about 5 to about 20% by weight R-1132a.

The compositions of the invention typically contain from about 1 to about 99% by weight R-32 or from about 2 to about 98% by weight R-32. Advantageously, such compositions comprise from about 2 to about 95% by weight R-32, such as from about 3 to about 95% by weight R-32. Conveniently, the compositions of the invention comprise from about 5 to about 90% by weight R-32, such as from about 5 to about 85% by weight R-32, for example from about 10 to about 80% by weight R-32. Preferably, such compositions comprise from about 15 to about 75% by weight R-32, such as from about 15 to about 70% by weight R-32.

The compositions of the invention typically contain from about 1 to about 99% by weight R-1234yf or from about 2 to about 98% by weight R-1234yf. Advantageously, such compositions comprise from about 2 to about 90% by weight R-1234yf, such as from 5 to about 90% by weight R-1234yf. Conveniently, the compositions of the invention comprise from about 7 to about 85% by weight R-1234yf, such as from about 8 to about 80% by weight R-1234yf. Preferably, such compositions comprise from about 10 to about 75% by weight R-1234yf, such as from about 10 to about 70% by weight R-1234yf, for example from about 10 to about 65% by weight R-1234yf.

Conveniently, compositions of the invention comprise from about 1 to about 60% by weight R-1132a, from about 1 to about 99% by weight R-32, and from about 1 to about 99% by weight R-1234yf. Such compositions typically contain from about 1 to about 50% by weight R-1132a, from about 2 to about 97% by weight R-32, and from about 2 to about 97% by weight R-1234yf.

Conveniently, compositions of the invention comprise from about 2 to about 60% by weight R-1132a, from about 1 to about 97% by weight R-32, and from about 1 to about 97% by weight R-1234yf. Such compositions typically contain from about 2 to about 50% by weight R-1132a, from about 2 to about 96% by weight R-32, and from about 2 to about 96% by weight R-1234yf.

Advantageously, compositions of the invention comprise from about 1 to about 40% by weight R-1132a, from about 5 to about 90% by weight R-32, and from about 5 to about 90% by weight R-1234yf; or from about 2 to about 40% by weight R-1132a, from about 5 to about 90% by weight R-32, and from about 5 to about 90% by weight R-1234yf; or from about 2 to about 40% by weight R-1132a, from about 4 to about 94% by weight R-32, and from about 4 to about 94% by weight R-1234yf.

Preferably, compositions of the invention comprise from about 3 to about 20% by weight R-1132a, from about 10 to about 80% by weight R-32 and from about 10 to about 75% by weight R-1234yf; or from about 3 to about 30% by weight R-1132a, from about 10 to about 91% by weight R-32 and from about 6 to about 87% by weight R-1234yf.

Conveniently, compositions of the invention comprise from about 5 to about 20% by weight R-1132a, from about 20 to about 70% by weight R-32 and from about 10 to about 65% by weight R-1234yf; or from about 4 to about 25% by weight R-1132a, from about 15 to about 88% by weight R-32 and from about 8 to about 81% by weight R-1234yf.

Typically, the compositions of the invention contain R-1132a, R-32 and 1234yf in a combined amount of from about 1 to about 99 weight %, optionally from about 1 to about 90 weight %, preferably from about 1 to about 80 weight %, such as from about 1 to about 75 weight %, for example from about 1 to about 70 weight %, based on the total weight of the composition.

Any of the above described compositions may additionally contain carbon dioxide (R-744, $CO_2$). Adding R-744 has the advantage of reducing the R-1132a in the vapour phase and hence reducing potential flammability of the vapour phase, but tends to increase compressor discharge temperature and temperature glide.

When present, the compositions of the invention typically contain from about 1 to about 30% by weight $CO_2$. Preferably, such compositions contain from about 2 to about 15% or about 20% by weight $CO_2$. In one embodiment, the compositions of the invention contain R-1132a and $CO_2$ in a combined amount of from about 2 to about 50% by weight, such as from about 2 to about 40% by weight, for instance from about 4 to about 30% by weight, e.g. from about 5 to about 20% by weight.

Any of the above described compositions may additionally contain 1,1,2-trifluoroethene (R-1123). An advantage of using R-1123 in the compositions of the invention is that it gives similar capacity to R-32 but it has negligible GWP. By incorporation of a proportion of R-1123 the overall GWP of a composition having similar capacity to R-410A may then be reduced compared to an equivalent ternary R-1132a/R-32/R-1234yf composition at constant R-1132a and R-1234yf proportions. R-1123 may only safely be used as a diluted component in compositions of the invention. The proportion of R-1123 in the compositions of the typically is such that the maximum molar concentration of R-1123 either in the composition of the invention as formulated or in its worst-case fractionated compositions (as defined in ASHRAE Standard 34 Appendix B) should be less than 40%.

When present, the compositions of the invention typically contain from about 1 to about 30% by weight R-1123; or from about 2 or about 5 to about 30% by weight R-1123. Preferably, such compositions contain from about 5 to about 20% by weight R-1123 such as from about 5 to about 15% by weight, for example from about 5 to about 10% by weight R-1123.

Alternatively, the compositions of the invention may contain less than about 8% or about 7% or about 6% or about 5% by weight R-1123, such as less than about 4% or about 3% by weight R-1132a, for example less than about 2% or about 1% by weight R-1123. Preferably, such compositions are substantially free of R-1123. Advantageously, the compositions of the invention contain no (readily detectable) R-1123.

When the compositions of the invention contain R-134a, typically it is present in an amount of from about 1 to about 40 weight %, for example from about 2 to about 30 weight %.

When present, the compositions of the invention typically contain R-125 in an amount of from about 1 to about 20 weight %, for example from about 2 to about 15 weight %.

When the compositions of the invention contain R-1234ze(E), typically it is present in an amount of from about 1 to about 40 weight %, for example from about 2 to about 30 weight %.

When present, the compositions of the invention typically contain R-152a in an amount of from about 1 to about 30 weight %, for example from about 2 to about 20 weight %.

When the compositions of the invention contain R-600a, typically it is present in an amount of from about 1 to about 20 weight %, such as from about 1 to about 10 weight %, for example from about 1 to about 5 weight %.

When present, the compositions of the invention typically contain R-290 in an amount of from about 1 to about 20 weight %, such as from about 1 to about 10 weight %, for example from about 1 to about 5 weight %.

When the compositions of the invention contain R-1270, typically it is present in an amount of from about 1 to about 20 weight %, such as from about 1 to about 10 weight %, for example from about 1 to about 5 weight %.

Preferred compositions of the invention containing 4 components include R-1132a, R-32, R-1234yf and R-152a;

R-1132a, R-32, R-1234yf and R-134a; R-1132a, R-32, R-1234yf and R-1234ze(E); R-1132a, R-32, R-1234yf and R-125; or R-1132a, R-32, R-1234yf and R-227ea. For the avoidance of doubt, these compositions may contain the amounts of the identified components as hereinbefore described.

Preferred compositions of the invention containing 5 components are set out in the following table, wherein "Base" represents R-1132a, R-32 and R-1234yf. For the avoidance of doubt, these compositions may contain the amounts of the identified components as hereinbefore described.

| | |
|---|---|
| Base + $CO_2$ and R-1234ze(E); | Base + R-1123 and R-1234ze(E); |
| Base + $CO_2$ and R-125; | Base + R-1123 and R-125; |
| Base + $CO_2$ and R-152a; | Base + R-1123 and R-152a; |
| Base + $CO_2$ and R-134a; | Base + R-1123 and R-134a; |
| Base + $CO_2$ and R-227ea; | Base + R-1123 and R-227ea; |
| Base + R-290 and R-1234ze(E); | Base + R-1270 and R-1234ze(E); |
| Base + R-290 and R-125; | Base + R-1270 and R-125; |
| Base + R-290 and R-152a; | Base + R-1270 and R-152a; |
| Base + R-290 and R-134a; | Base + R-1270 and R-134a; |
| Base + R-290 and R-227ea; | Base + R-1270 and R-227ea; |
| Base + R-600A and R-1234ze(E); | Base + R-1234ze(E) and R-125; |
| Base + R-600A and R-125; | Base + R-1234ze(E) and R-152a; |
| Base + R-600A and R-152a; | Base + R-1234ze(E) and R-134a; |
| Base + R-600A and R-134a; | Base + R-1234ze(E) and R-227ea; |
| Base + R-600A and R-227ea; | |
| Base + R-125 and R-152a; | Base + R-152a and R-134a; |
| Base + R-125 and R-134a; | Base + R-152a and R-227ea; |
| Base + R-125 and R-227ea; | Base + R-134a; and R-227ea |

Preferred compositions of the invention containing 6 components are set out in the following table, wherein "Base" represents R-1132a, R-32 and R-1234yf. For the avoidance of doubt, these compositions may contain the amounts of the identified components as hereinbefore described.

| | |
|---|---|
| Base + $CO_2$, R-1123 and R-1234ze(E); | Base + $CO_2$, R-290 and R-1234ze(E); |
| Base + $CO_2$, R-1123 and R-125; | Base + $CO_2$, R-290 and R-125; |
| Base + $CO_2$, R-1123 and R-152a; | Base + $CO_2$, R-290 and R-152a; |
| Base + $CO_2$, R-1123 and R-134a; | Base + $CO_2$, R-290 and R-134a; |
| Base + $CO_2$, R-1123 and R-227ea; | Base + $CO_2$, R-290 and R-227ea; |
| Base + $CO_2$, R-1270 and R-1234ze(E); | Base + $CO_2$, R-600a and R-1234ze(E); |
| Base + $CO_2$, R-1270 and R-125; | Base + $CO_2$, R-600a and R-125; |
| Base + $CO_2$, R-1270 and R-152a; | Base + $CO_2$, R-600a and R-152a; |
| Base + $CO_2$, R-1270 and R-134a; | Base + $CO_2$, R-600a and R-134a; |
| Base + $CO_2$, R-1270 and R-227ea; | Base + $CO_2$, R-600a and R-227ea; |
| Base + R-1234ze(E), R-125 and R-152a; | Base + R-125, R-134a and R-227ea; |
| Base + R-1234ze(E), R-125 and R-134a; | Base + R-125, R-134a and R-152a; |
| Base + R-1234ze(E), R-125 and R-227ea; | Base + R-125, R-152a and R-227ea; |
| Base + R-1234ze(E), R-152a and R-134a; | Base + R-227ea, R-152a and R-134a; |
| Base + R-1234ze(E), R-152a and R-227ea; | |
| Base + R-1234ze(E), R-134a and R-227ea; | |
| Base + R-1123, R-290 and R-1234ze(E); | Base + R-1123, R-1270 and R-1234ze(E); |
| Base + R-1123, R-290 and R-125; | Base + R-1123, R-1270 and R-125; |
| Base + R-1123, R-290 and R-152a; | Base + R-1123, R-1270 and R-152a; |
| Base + R-1123, R-290 and R-134a; | Base + R-1123, R-1270 and R-134a; |
| Base + R-1123, R-290 and R-227ea; | Base + R-1123, R-1270 and R-227ea; |
| Base + R-1123, R-600a and R-1234ze(E); | Base + R-290, R-1270 and R-1234ze(E); |
| Base + R-1123, R-600a and R-125; | Base + R-290, R-1270 and R-125; |
| Base + R-1123, R-600a and R-152a; | Base + R-290, R-1270 and R-152a; |
| Base + R-1123, R-600a and R-134a; | Base + R-290, R-1270 and R-134a; |
| Base + R-1123, R-600a and R-227ea; | Base + R-290, R-1270 and R-227ea; |
| Base + R-290, R-600a and R-1234ze(E); | Base + R-600a, R-1270 and R-1234ze(E); |
| Base + R-290, R-600a and R-125; | Base + R-600a, R-1270 and R-125; |
| Base + R-290, R-600a and R-152a; | Base + R-600a, R-1270 and R-152a; |
| Base + R-290, R-600a and R-134a; | Base + R-600a, R-1270 and R-134a; or |
| Base + R-290, R-600a and R-227ea; | Base + R-600a, R-1270 and R-227ea. |

The invention further provides a composition comprising from about 6 to about 18 weight % R-1132a, from about 20 to about 65 weight % R-32 and from about 15 to about 60 weight % R-1234yf. For simplicity, this will be referred to hereinafter as the first ternary composition of the invention.

Typically, the first ternary composition of the invention contains from about 6 to about 15 weight % R-1132a, preferably from about 6 to about 12 weight %, such as from about 7 to about 10 weight %. For example, the first ternary composition of the invention comprises from about 6 to about 7 weight % of R-1132a.

Conveniently, the first ternary composition of the invention contains from about 25 to about 65 weight % R-32, preferably from about 35 to about 60 weight %, such as from about 40 to about 60 weight %.

Typically, the first ternary composition of the invention contains from about 20 to about 60 weight % R-1234yf, preferably from about 25 to about 55 weight %, such as from about 30 to about 55 weight %.

In one embodiment, the first ternary composition of the invention comprises from about 6 to about 8 wt. % R-1132a, from about 42 to about 45 wt. % R-32 and from about 47 to about 51 wt. % R-1234yf.

Preferred first ternary compositions of the invention include blends of: about 7 weight % R-1132a, about 50 weight % R-32 and about 43 weight % R-1234yf; about 7 weight % R-1132a, about 55 weight % R-32 and about 38 weight % R-1234yf; about 8 weight % R-1132a, about 40 weight % R-32 and about 52 weight % R-1234yf; about 8 weight % R-1132a, about 60 weight % R-32 and about 32 weight % R-1234yf; and about 10 weight % R-1132a, about 55 weight % R-32 and about 35 weight % R-1234yf.

In one embodiment, the tolerances (e.g. manufacturing tolerances) in such compositions are +0.5%/−1% R-1132a; ±1% R-32; ±1.5% R-1234yf by weight In one embodiment of the present invention, there is provided the use of a composition comprising a POE lubricant and the first ternary composition of the invention as a replacement for an existing heat transfer composition in a commercial air conditioning system. Preferably, the existing heat transfer composition is R-410A.

In another embodiment of the present invention, there is provided the use of a composition comprising a POE lubricant and the first ternary composition of the invention as a replacement for an existing heat transfer composition in a commercial refrigeration system. Conveniently, the existing heat transfer composition is R-410A.

The invention further provides a composition comprising from about 6 to about 18 weight % R-1132a, from about 5 to about 35 weight % R-32 and from about 47 to about 89 weight % R-1234yf. For simplicity, this will be referred to hereinafter as the second ternary composition of the invention.

Typically, the second ternary composition of the invention contains from about 6 to about 15 weight % R-1132a, preferably from about 7 to about 12 weight %, such as from about 7 to about 10 weight %.

Conveniently, the second ternary composition of the invention contains from about 6 to about 30 weight % R-32, preferably from about 7 to about 20 weight %, such as from about 8 to about 15 weight %, for example from about 9 to about 13 weight %.

Typically, the second ternary composition of the invention contains from about 55 to about 88 weight % R-1234yf, preferably from about 60 to about 87 weight %, such as from about 75 to about 85 weight % for example from about 78 to about 84 weight %.

A preferred second ternary composition of the invention is a blend of about 7 weight % R-1132a, about 50 weight % R-32 and about 43 weight % R-1234yf;

According to another aspect of the present invention, there is provided a composition comprising 1,1-difluoroethene (R-1132a), difluoromethane (R-32), 2,3,3,3-tetrafluoropropene (R-1234yf) and carbon dioxide ($CO_2$, R-744). For simplicity, this will be referred to hereinafter as an "alternative quaternary" composition of the invention.

The alternative quaternary composition of the invention may comprise from about 2 to about 15 weight % of R-1132a, from about 20 to about 60 weight % of R-32, from about 25 to about 70 weight % of R-1234yf and from about 2 to about 12 weight % of $CO_2$ based on the total weight of the composition.

The alternative quaternary composition of the invention may comprise from about 4 to about 10 weight % of R-1132a, from about 30 to about 48 weight % of R-32 from about 34 to about 64 weight % of R-1234yf and from about 2 to about 8 weight % of $CO_2$, such as from about 4 to about 10 weight % of R-1132a, from about 36 to about 48 weight % of R-32, from about 37 to about 57 weight % of R-1234yf and from about 3 to about 5 weight % of $CO_2$ based on the total weight of the composition.

Typically, the alternative quaternary composition of the present invention contains from about 4 or 5 or 6 to about 10 weight % of R-1132a, preferably from about 4 or 5 or 6 to about 9 weight %, such as from about 4 or 5 or 6 to about 8 weight % based on the total weight of the composition.

Conveniently, the alternative quaternary composition of the invention contains from about 32 to about 44 weight % of R-32, preferably from about 36 to about 44 weight %, such as from about 36 to about 40 weight % based on the total weight of the composition.

Typically, the alternative quaternary composition of the invention contains from about 34 to about 60 weight % of R-1234yf, preferably from about 39 to about 56 weight %, such as from about 43 to about 54 weight %, for example from about 43 to about 51 weight % based on the total weight of the composition.

Preferably, the alternative quaternary composition of the invention contains from about 2 or 3 to about 7 weight % of $CO_2$, such as from about 3 or 4 to about 6 weight %, for example from about 3 to about 5 weight % based on the total weight of the composition.

Preferred alternative quaternary compositions of the invention include the blends of:
about 6 weight % R-1132a, about 40 weight % R-32, about 51 weight % R-1234yf and about 3 weight % $CO_2$;
about 7 weight % R-1132a, about 36 weight % R-32, about 54 weight % R-1234yf and about 3 weight % $CO_2$;
about 9 weight % R-1132a, about 44 weight % R-32, about 43 weight % R-1234yf and about 4 weight % $CO_2$; or
about 7 weight % R-1132a, about 30 weight % R-32, about 60 weight % R-1234yf and about 3 weight % $CO_2$;
based on the total weight of the composition.

In one embodiment, the tolerances (e.g. manufacturing tolerances) in such compositions are +1%/−0.5% $CO_2$; +0.5%/−1% R-1132a; ±1% R-32; ±2% R-1234yf by weight.

For completeness, it is noted that phrases such as "the compositions" or "the compositions of the invention" and the like as used in the paragraphs below refer to the compositions disclosed on pages 3 to 11 of the present specification; this includes "the compositions of the invention" (e.g. pages 3 to 8), "first ternary compositions of the invention" (e.g. pages 8 to 9), "second ternary compositions of the invention" (e.g. pages 9 to 10) and "alternative quaternary compositions of the invention" (e.g. pages 10 to 11).

In an embodiment, the compositions may consist essentially of the stated components. By the term "consist essentially of", we include the meaning that the compositions of the invention contain substantially no other components, particularly no further (hydro)(fluoro)compounds (e.g. (hydro)(fluoro)alkanes or (hydro)(fluoro)alkenes) known to be used in heat transfer compositions. The term "consist of" is included within the meaning of "consist essentially of".

In an embodiment, the compositions of the invention are substantially free of any component that has heat transfer properties (other than the components specified). For instance, the compositions of the invention may be substantially free of any other hydrofluorocarbon compound.

By "substantially no" and "substantially free of", we include the meaning that the compositions of the invention contain 0.5% by weight or less of the stated component, preferably 0.4%, 0.3%, 0.2% or 0.1% or less, based on the total weight of the composition.

In one embodiment, the compositions of the present invention are substantially free of trifluoroiodomethane ($CF_3I$).

All of the chemicals herein described are commercially available. For example, the fluorochemicals may be obtained from Apollo Scientific (UK) and carbon dioxide may be obtained from liquefied gas suppliers such as Linde AG.

As used herein, all % amounts mentioned in compositions herein, including in the claims, are by weight based on the total weight of the compositions, unless otherwise stated.

By the term "about", as used in connection with numerical values of amounts of components in % by weight, we include the meaning of ±0.5% by weight, for example ±0.5% by weight.

For the avoidance of doubt, it is to be understood that the stated upper and lower values for ranges of amounts of components in the compositions of the invention described herein may be interchanged in any way, provided that the resulting ranges fall within the broadest scope of the invention.

The compositions of the invention have zero ozone depletion potential.

Typically, the compositions of the invention have a GWP of less than about 650, such as less than about 600, for example less than about 500. Preferably, the compositions of the invention have a GWP of less than about 480, such as less than about 450, for example less than about 400. Conveniently, the compositions of the invention have a GWP of less than about 300, such as from about 220 to about 300, for example less than about 280, for instance less than about 250.

Typically, the compositions of the invention are of reduced flammability hazard when compared to R-1132a.

Flammability may be determined in accordance with ASHRAE Standard 34 incorporating the ASTM Standard E-681 with test methodology as per Addendum 34p dated 2004, the entire content of which is incorporated herein by reference.

In one aspect, the compositions have one or more of (a) a higher lower flammable limit; (b) a higher ignition energy (c) a higher auto-ignition temperature; or (d) a lower burning velocity compared to R-1132a alone. Preferably, the compositions of the invention are less flammable compared to R-1132a in one or more of the following respects: lower flammable limit at 23° C.; lower flammable limit at 60° C.; breadth of flammable range at 23° C. or 60° C.; auto-ignition temperature (thermal decomposition temperature); minimum ignition energy in dry air or burning velocity. The flammable limits and burning velocity being determined according to the methods specified in ASHRAE-34 and the auto-ignition temperature being determined in a 500 ml glass flask by the method of ASTM E659-78.

In a preferred embodiment, the compositions of the invention are non-flammable. For example, the compositions of the invention are non-flammable at a test temperature of 60° C. using the ASHRAE-34 methodology. Advantageously, the mixtures of vapour that exist in equilibrium with the compositions of the invention at any temperature between about −20° C. and 60° C. are also non-flammable.

In some applications it may not be necessary for the formulation to be classed as non-flammable by the ASHRAE-34 methodology. It is possible to develop fluids whose flammability limits will be sufficiently reduced in air to render them safe for use in the application, for example if it is physically not possible to make a flammable mixture by leaking the refrigeration equipment charge into the surrounds.

In one embodiment, the compositions of the invention have a flammability classifiable as 1 or 2L according to the ASHRAE standard 34 classification method, indicating non-flammability (class 1) or a weakly flammable fluid with flame speed lower than 10 cm/s (class 2L).

Based on the burning velocity data for a ternary composition of R-1132a/R-32/R-1234yf (40/49/11% by volume; burning velocity of 11.4 cm/s) and the literature values of burning velocities R-32/R-1234yf mixtures ("Laminar flame speeds of 2,3,3,3-tetrafluoropropene mixtures" Papas, P et al. Proceedings of the Combustion Institute 36 (2017) 1145-1154, which is incorporated herein by reference in its entirety), we estimate that the compositions of the present invention will achieve a burning velocity of less than about 10 cm/s if the molar (volume) concentration of R-1132a in their worst-case fractionated formulations (WCFF, as defined in ASHRAE Standard 34 Appendix B), is less than about 35% v/v and preferably less than about 30% v/v.

Accordingly, without wishing to be bound by theory, it is postulated that the compositions of the present invention will achieve a burning velocity of less than about 10 cm/s (and hence a 2L flammability classification) if the molar (volume) concentration of R-1132a in their worst-case fractionated formulations (WCFF, as defined in ASHRAE Standard 34 Appendix B), is less than about 35% v/v and preferably less than about 30% v/v.

Therefore, in one embodiment, the compositions of the present invention have the molar (volume) concentration of R-1132a in their worst-case fractionated formulations (WCFF, as defined in ASHRAE Standard 34 Appendix B) of less than about 35% v/v and preferably less than about 30% v/v.

In one embodiment, the compositions of the present invention have a burning velocity of less than about 10 cm/s, preferably less than about 9.5 cm/s, for example less than about 9 cm/s, such as less than about 8.5 cm/s or less than about 8 cm/s.

For example, a preferred alternative quaternary composition of the present invention has about 28% v/v of R-1132a in its WCFF and a burning velocity of about 8.7 cm/s.

The present invention also provides a vessel comprising the composition of the present invention in an amount of up to about 90% v/v based on the total volume of the vessel, wherein the vessel has a temperature of about −40° C. and wherein the composition comprises R-1132a in a molar volume concentration of less than about 35% v/v, preferably less than about 30% v/v, based on the total volume of the composition. Preferably, the vessel is a cylinder.

For the avoidance of doubt, it is to be understood that "v/v" as used herein denotes "molar volume concentration".

The compositions of the invention preferably have a temperature glide in an evaporator or condenser of less than about 10K, preferably less than about 7 or about 6K, even more preferably less than about 5K, such as less than about 4K and even more preferably less than about 1K.

It is believed that the compositions of the invention exhibit a completely unexpected combination of low-/non-flammability, low GWP, improved lubricant miscibility and improved refrigeration performance properties. Some of these refrigeration performance properties are explained in more detail below.

The compositions of the invention typically have a volumetric refrigeration capacity that is at least 80% of that of R-410A, such as at least 85% of that of R-410A. Preferably, the compositions of the invention have a volumetric refrigeration capacity that is at least 90% of that of R-410A, for example from about 95% to about 130% of that of R-410A. In one embodiment, the compositions of the invention have a volumetric refrigeration capacity that is within about 15% of that of R-410A, such as about 10% of that of R-410A, even more preferably within about 5% of that of R-410A.

In one embodiment, the cycle efficiency (Coefficient of Performance, COP) of the compositions of the invention is within about 10% of R-410A, preferably within about 7% of R-410A, such as within 5% of R-410A. Preferably, the cycle efficiency is equivalent to or higher than R-410A.

Conveniently, the compressor discharge temperature of the compositions of the invention is within about 15K of the existing refrigerant fluid it is replacing (e.g. R-410A or R-32), preferably within about 10K or even about 5K. Advantageously, the compressor discharge temperature of the compositions of the invention is lower than that of R-32.

Conveniently, the operating pressure in a condenser containing a composition of the invention is lower than that of the condenser containing R-32. In one embodiment, the operating condenser pressure in a condenser containing a composition of the invention is within about 10% of that of the condenser containing R-410A, preferably within about 5%.

The compositions of the invention are typically suitable for use in existing designs of equipment, and are compatible with all classes of lubricant currently used with established HFC refrigerants. They may be optionally stabilised or compatibilised with mineral oils by the use of appropriate additives.

Preferably, when used in heat transfer equipment, the composition of the invention is combined with a lubricant.

Conveniently, the lubricant is selected from the group consisting of mineral oil, silicone oil, polyalkyl benzenes (PABs), polyol esters (POEs), polyalkylene glycols (PAGs), polyalkylene glycol esters (PAG esters), polyvinyl ethers (PVEs), poly (alpha-olefins) and combinations thereof. PAGs and POEs are currently preferred lubricants for the compositions of the invention.

Advantageously, the lubricant further comprises a stabiliser.

Preferably, the stabiliser is selected from the group consisting of diene-based compounds, phosphates, phenol compounds and epoxides, and mixtures thereof.

Conveniently, the composition of the invention may be combined with a flame retardant.

Advantageously, the flame retardant is selected from the group consisting of tri-(2-chloroethyl)-phosphate, (chloropropyl) phosphate, tri-(2,3-dibromopropyl)-phosphate, tri-(1,3-dichloropropyl)-phosphate, diammonium phosphate, various halogenated aromatic compounds, antimony oxide, aluminium trihydrate, polyvinyl chloride, a fluorinated iodocarbon, a fluorinated bromocarbon, trifluoro iodomethane, perfluoroalkyl amines, bromo-fluoroalkyl amines and mixtures thereof.

In one embodiment, the invention provides a heat transfer device comprising a composition of the invention. Preferably, the heat transfer device is a refrigeration device.

Conveniently, the heat transfer device is a residential or commercial air conditioning system, a heat pump or a commercial or industrial refrigeration system.

The invention also provides the use of a composition of the invention in a heat transfer device, such as a refrigeration system, as herein described.

According to another aspect of the invention, there is provided a sprayable composition comprising a material to be sprayed and a propellant comprising a composition of the invention.

According to a further aspect of the invention, there is provided a method for cooling an article which comprises condensing a composition of the invention and thereafter evaporating said composition in the vicinity of the article to be cooled.

According to another aspect of the invention, there is provided a method for heating an article which comprises condensing a composition of the invention in the vicinity of the article to be heated and thereafter evaporating said composition.

According to a further aspect of the invention, there is provided a method for extracting a substance from biomass comprising contacting the biomass with a solvent comprising a composition of the invention, and separating the substance from the solvent.

According to another aspect of the invention, there is provided a method of cleaning an article comprising contacting the article with a solvent comprising a composition of the invention.

According to a further aspect of the invention, there is provided a method for extracting a material from an aqueous solution comprising contacting the aqueous solution with a solvent comprising a composition of the invention, and separating the material from the solvent.

According to another aspect of the invention, there is provided a method for extracting a material from a particulate solid matrix comprising contacting the particulate solid matrix with a solvent comprising a composition of the invention, and separating the material from the solvent.

According to a further aspect of the invention, there is provided a mechanical power generation device containing a composition of the invention.

Preferably, the mechanical power generation device is adapted to use a Rankine Cycle or modification thereof to generate work from heat.

According to another aspect of the invention, there is provided a method of retrofitting a heat transfer device comprising the step of removing an existing heat transfer fluid, and introducing a composition of the invention. Preferably, the heat transfer device is a refrigeration device, such as an ultra-low temperature refrigeration system. Advantageously, the method further comprises the step of obtaining an allocation of greenhouse gas (e.g. carbon dioxide) emission credit.

In accordance with the retrofitting method described above, an existing heat transfer fluid can be fully removed from the heat transfer device before introducing a composition of the invention. An existing heat transfer fluid can also be partially removed from a heat transfer device, followed by introducing a composition of the invention.

The compositions of the invention may also be prepared simply by mixing the R-1132a, R-32, R-1234yf (and optional components such as R-744, R-1123, hydrocarbons, a lubricant, a stabiliser or an additional flame retardant) in the desired proportions. The compositions can then be added to a heat transfer device (or used in any other way as defined herein).

In a further aspect of the invention, there is provided a method for reducing the environmental impact arising from operation of a product comprising an existing compound or composition, the method comprising replacing at least partially the existing compound or composition with a composition of the invention.

By environmental impact we include the generation and emission of greenhouse warming gases through operation of the product.

As mentioned above, this environmental impact can be considered as including not only those emissions of compounds or compositions having a significant environmental impact from leakage or other losses, but also including the emission of carbon dioxide arising from the energy consumed by the device over its working life. Such environmental impact may be quantified by the measure known as Total Equivalent Warming Impact (TEWI). This measure has been used in quantification of the environmental impact of certain stationary refrigeration and air conditioning equipment, including for example supermarket refrigeration systems.

The environmental impact may further be considered as including the emissions of greenhouse gases arising from the synthesis and manufacture of the compounds or compositions. In this case the manufacturing emissions are added to the energy consumption and direct loss effects to yield the measure known as Life-Cycle Carbon Production (LCCP). The use of LCCP is common in assessing environmental impact of automotive air conditioning systems.

In a preferred embodiment, the use of the composition of the invention results in the equipment having a lower Total Equivalent Warming Impact, and/or a lower Life-Cycle Carbon Production than that which would be attained by use of the existing compound or composition.

These methods may be carried out on any suitable product, for example in the fields of air-conditioning, refrigeration (e.g. low and ultra-low temperature refrigeration), heat transfer, aerosols or sprayable propellants, gaseous dielectrics, flame suppression, solvents (e.g. carriers for flavorings and fragrances), cleaners, topical anesthetics, and expansion applications. Preferably, the field is refrigeration.

Examples of suitable products include heat transfer devices, sprayable compositions, solvents and mechanical power generation devices. In a preferred embodiment, the product is a heat transfer device, such as a refrigeration device.

The existing compound or composition has an environmental impact as measured by GWP and/or TEWI and/or LCCP that is higher than the composition of the invention which replaces it. The existing compound or composition may comprise a fluorocarbon compound, such as a perfluoro-, hydrofluoro-, chlorofluoro- or hydrochlorofluorocarbon compound or it may comprise a fluorinated olefin.

Preferably, the existing compound or composition is a heat transfer compound or composition such as a refrigerant. Examples of refrigerants that may be replaced include R-410A, R454B, R-452B and R-32, preferably R-410A.

Any amount of the existing compound or composition may be replaced so as to reduce the environmental impact. This may depend on the environmental impact of the existing compound or composition being replaced and the environmental impact of the replacement composition of the invention. Preferably, the existing compound or composition in the product is fully replaced by the composition of the invention.

The invention is illustrated by the following non-limiting examples.

EXAMPLES

Performance Assessment

Two thermodynamic models of the fluid system were constructed, with pure component data and mixture equilibrium data fitted into each of them. The NIST REFPROP 9.1 software was used to build the first model. Mexichem in-house software coded in Matlab was used to build the second model to correlate accurately the vapour-liquid equilibrium properties of the mixture components. The predictions of both models for a typical air-conditioning cycle were checked against each other and were found to be in good agreement. The Mexichem equilibrium model gave more accurate fitting of our experimental mixture equilibrium data. It was therefore used for both performance modelling and derivation of the worst-case composition for flammability. The conditions used for the modelling are shown in Table 1 below; these represent an air-conditioning cycle application.

TABLE 1

| Modelling conditions used for assessing performance | | |
|---|---|---|
| Parameter | Units | Value |
| Cooling duty | kW | 14.2 |
| Mean condenser temperature | ° C. | 54.4 |
| Mean evaporator temperature | ° C. | 7.2 |
| Condenser subcooling | K | 8.3 |
| Evaporator superheat | K | 5.6 |
| Evaporator pressure drop | bar | 0.00 |
| Suction line pressure drop | bar | 0.00 |
| Condenser pressure drop | bar | 0.00 |
| Compressor suction superheat | K | 11.1 |
| Isentropic efficiency | | 70.0% |

The measured performance data for the compositions of the present invention is listed in the following tables (Examples 1 to 26).

In addition, the Matlab thermodynamic property model for the compositions of the present invention was used to estimate WCFF compositions as the initial vapour in a cylinder filled to 90% maximum at −40° C. The following operating conditions were assumed:

| | |
|---|---|
| Cylinder fill temperature (° C.) | 54.4 |
| Cylinder fractionation temperature (° C.) | −40 |
| Liquid density model used | Quartic |
| VLE model used | Peng Robinson/Wong Sandler |
| Matlab workspace file | LFR databank Jun. 25th, 2019.mat' |

Blending Tolerances for ASHRAE (% Mass)

| Component | Upper bound | Lower bound |
|---|---|---|
| R-1132a | 0.5 | 1 |
| R-744 | 1 | 0.5 |
| R-32 | 1 | 1 |
| R-1234yf | 1.5 | 1.5 |

The results are outlined in Examples 27 to 40.

It can be seen that in nearly all cases the initial vapour composition is less than 35% by volume of R-1132a.

Example 1 (Ternary Blends of R-1132a/R-32/R-1234yf Comprising 4 Weight % R-1132a)

| Results | | R410A | Nominal composition (weight %) | | | | | | | |
|---|---|---|---|---|---|---|---|---|---|---|
| | | | R-1132a | 4 | 4 | 4 | 4 | 4 | 4 | 4 |
| | | | R-32 | 36 | 38 | 40 | 42 | 44 | 46 | 48 |
| | | | R-1234yf | 60 | 58 | 56 | 54 | 52 | 50 | 48 |
| GWP (AR4 basis) | | 2107 | | 244 | 257 | 271 | 284 | 298 | 311 | 325 |
| Cooling COP relative to reference | | 100.0% | | 106.3% | 106.2% | 105.9% | 105.7% | 105.5% | 105.3% | 105.1% |
| Cooling Capacity relative to reference | | 100.0% | | 84.3% | 85.7% | 87.2% | 88.6% | 90.1% | 91.5% | 92.8% |
| Compressor discharge temperature difference | K | 0.0 | | −4.2 | −3.4 | −2.4 | −1.5 | −0.6 | 0.4 | 1.2 |
| Pressure ratio | | 3.32 | | 3.49 | 3.48 | 3.47 | 3.46 | 3.46 | 3.45 | 3.44 |
| Volumetric efficiency | | 94.5% | | 93.6% | 93.7% | 93.7% | 93.8% | 93.9% | 94.0% | 94.0% |
| Condenser glide | K | 0.2 | | 5.9 | 5.4 | 5.2 | 4.9 | 4.7 | 4.5 | 4.1 |
| Evaporator glide | K | 0.1 | | 6.0 | 5.7 | 5.5 | 5.3 | 5.0 | 4.8 | 4.5 |
| Evaporator inlet temperature | °C. | 7.2 | | 4.2 | 4.4 | 4.5 | 4.6 | 4.7 | 4.8 | 5.0 |
| Condenser exit temperature | °C. | 46.0 | | 43.2 | 43.4 | 43.5 | 43.7 | 43.8 | 43.9 | 44.0 |
| Condenser pressure | bar | 33.7 | | 27.5 | 27.9 | 28.4 | 28.8 | 29.3 | 29.7 | 30.1 |
| Evaporator pressure | bar | 10.2 | | 7.9 | 8.0 | 8.2 | 8.3 | 8.5 | 8.6 | 8.7 |
| Refrigeration effect | kJ/kg | 151.2 | | 157.1 | 159.0 | 161.2 | 163.2 | 165.4 | 167.6 | 169.6 |
| Coefficient of Performance (COP) | | 2.88 | | 3.07 | 3.06 | 3.05 | 3.05 | 3.04 | 3.04 | 3.03 |
| Discharge temperature | °C. | 105.5 | | 101.3 | 102.1 | 103.1 | 104.0 | 105.0 | 105.9 | 106.7 |
| Mass flow rate | kg/hr | 251 | | 242 | 239 | 236 | 233 | 230 | 227 | 224 |
| Volumetric flow rate | m$^3$/hr | 7.28 | | 8.63 | 8.49 | 8.34 | 8.21 | 8.07 | 7.95 | 7.84 |
| Volumetric cooling capacity | kJ/m$^3$ | 5226 | | 4403 | 4478 | 4558 | 4632 | 4709 | 4784 | 4851 |
| Suction line pressure drop | Pa/m | 163 | | 189 | 184 | 179 | 174 | 170 | 165 | 161 |
| Suction line gas density | kg/m$^3$ | 34.6 | | 28.0 | 28.2 | 28.3 | 28.4 | 28.5 | 28.5 | 28.6 |
| Condenser line gas density | kg/m$^3$ | 155.3 | | 128.6 | 129.1 | 130.0 | 130.5 | 131.1 | 131.7 | 131.8 |

Example 2 (Ternary Blends of R-1132a/R-32/R-1234yf Comprising 5 Weight % R-1132a)

| Results | | R410A | Nominal composition (weight %) | | | | | | | |
|---|---|---|---|---|---|---|---|---|---|---|
| | | | R-1132a | 5 | 5 | 5 | 5 | 5 | 5 | 5 |
| | | | R-32 | 36 | 38 | 40 | 42 | 44 | 46 | 48 |
| | | | R-1234yf | 59 | 57 | 55 | 53 | 51 | 49 | 47 |
| GWP (AR4 basis) | | 2107 | | 244 | 257 | 271 | 284 | 298 | 311 | 325 |
| Cooling COP relative to reference | | 100.0% | | 105.9% | 105.7% | 105.5% | 105.3% | 105.1% | 104.9% | 104.7% |
| Cooling Capacity relative to reference | | 100.0% | | 85.4% | 86.9% | 88.4% | 89.8% | 91.4% | 92.7% | 94.1% |
| Compressor discharge temperature difference | K | 0.0 | | −3.8 | −2.8 | −1.9 | −1.1 | −0.1 | 0.8 | 1.7 |
| Pressure ratio | | 3.32 | | 3.49 | 3.48 | 3.47 | 3.46 | 3.46 | 3.45 | 3.44 |
| Volumetric efficiency | | 94.5% | | 93.6% | 93.7% | 93.8% | 93.8% | 93.9% | 94.0% | 94.1% |
| Condenser glide | K | 0.2 | | 6.0 | 5.7 | 5.4 | 5.0 | 4.9 | 4.6 | 4.3 |
| Evaporator glide | K | 0.1 | | 6.2 | 6.0 | 5.7 | 5.5 | 5.2 | 4.9 | 4.7 |
| Evaporator inlet temperature | °C. | 7.2 | | 4.1 | 4.2 | 4.4 | 4.5 | 4.6 | 4.7 | 4.9 |
| Condenser exit temperature | °C. | 46.0 | | 43.1 | 43.3 | 43.4 | 43.6 | 43.7 | 43.8 | 44.0 |
| Condenser pressure | bar | 33.7 | | 28.0 | 28.4 | 28.9 | 29.3 | 29.8 | 30.2 | 30.6 |
| Evaporator pressure | bar | 10.2 | | 8.0 | 8.2 | 8.3 | 8.5 | 8.6 | 8.8 | 8.9 |
| Refrigeration effect | kJ/kg | 151.2 | | 157.1 | 159.1 | 161.2 | 163.1 | 165.4 | 167.5 | 169.6 |
| Coefficient of Performance (COP) | | 2.88 | | 3.05 | 3.05 | 3.04 | 3.04 | 3.03 | 3.02 | 3.02 |
| Discharge temperature | °C. | 105.5 | | 101.8 | 102.7 | 103.6 | 104.4 | 105.5 | 106.3 | 107.2 |
| Mass flow rate | kg/hr | 251 | | 242 | 239 | 236 | 233 | 230 | 227 | 224 |
| Volumetric flow rate | m$^3$/hr | 7.28 | | 8.52 | 8.37 | 8.23 | 8.10 | 7.96 | 7.85 | 7.73 |
| Volumetric cooling capacity | kJ/m$^3$ | 5226 | | 4463 | 4543 | 4622 | 4695 | 4775 | 4844 | 4915 |
| Suction line pressure drop | Pa/m | 163 | | 186 | 181 | 176 | 172 | 167 | 163 | 159 |
| Suction line gas density | kg/m$^3$ | 34.6 | | 28.4 | 28.6 | 28.7 | 28.8 | 28.9 | 28.9 | 29.0 |
| Condenser line gas density | kg/m$^3$ | 155.3 | | 131.2 | 132.0 | 132.7 | 133.1 | 134.0 | 134.2 | 134.5 |

Example 3 (Ternary Blends of R-1132a/R-32/R-1234yf Comprising 6 Weight % R-1132a)

| Results | | R410A | Nominal composition (weight %) | | | | | | |
|---|---|---|---|---|---|---|---|---|---|
| | | | R-1132a | 6 | 6 | 6 | 6 | 6 | 6 | 6 |
| | | | R-32 | 36 | 38 | 40 | 42 | 44 | 46 | 48 |
| | | | R-1234yf | 58 | 56 | 54 | 52 | 50 | 48 | 46 |
| GWP (AR4 basis) | | 2107 | | 244 | 257 | 271 | 284 | 298 | 311 | 325 |
| Cooling COP relative to reference | | 100.0% | | 105.5% | 105.3% | 105.1% | 104.9% | 104.7% | 104.4% | 104.3% |
| Cooling Capacity relative to reference | | 100.0% | | 86.6% | 88.2% | 89.6% | 91.1% | 92.5% | 93.8% | 95.3% |
| Compressor discharge temperature difference | K | 0.0 | | −3.3 | −2.4 | −1.5 | −0.6 | 0.3 | 1.2 | 2.1 |
| Pressure ratio | | 3.32 | | 3.49 | 3.48 | 3.47 | 3.46 | 3.45 | 3.44 | 3.44 |
| Volumetric efficiency | | 94.5% | | 93.6% | 93.7% | 93.8% | 93.8% | 93.9% | 94.0% | 94.1% |
| Condenser glide | K | 0.2 | | 6.1 | 5.9 | 5.5 | 5.3 | 5.0 | 4.5 | 4.4 |
| Evaporator glide | K | 0.1 | | 6.4 | 6.2 | 5.9 | 5.7 | 5.4 | 5.1 | 4.9 |
| Evaporator inlet temperature | °C | 7.2 | | 4.0 | 4.1 | 4.3 | 4.4 | 4.5 | 4.7 | 4.8 |
| Condenser exit temperature | °C | 46.0 | | 43.1 | 43.2 | 43.4 | 43.5 | 43.6 | 43.8 | 43.9 |
| Condenser pressure | bar | 33.7 | | 28.4 | 28.9 | 29.4 | 29.8 | 30.3 | 30.7 | 31.1 |
| Evaporator pressure | bar | 10.2 | | 8.2 | 8.3 | 8.5 | 8.6 | 8.8 | 8.9 | 9.0 |
| Refrigeration effect | kJ/kg | 151.2 | | 157.0 | 159.1 | 161.1 | 163.2 | 165.3 | 167.2 | 169.5 |
| Coefficient of Performance (COP) | | 2.88 | | 3.04 | 3.03 | 3.03 | 3.02 | 3.02 | 3.01 | 3.01 |
| Discharge temperature | °C | 105.5 | | 102.2 | 103.2 | 104.0 | 105.0 | 105.9 | 106.7 | 107.6 |
| Mass flow rate | kg/hr | 251 | | 242 | 239 | 236 | 233 | 230 | 227 | 224 |
| Volumetric flow rate | m³/hr | 7.28 | | 8.40 | 8.25 | 8.12 | 7.98 | 7.86 | 7.75 | 7.64 |
| Volumetric cooling capacity | kJ/m³ | 5226 | | 4524 | 4607 | 4683 | 4761 | 4836 | 4903 | 4979 |
| Suction line pressure drop | Pa/m | 163 | | 184 | 179 | 174 | 169 | 165 | 162 | 157 |
| Suction line gas density | kg/m³ | 34.6 | | 28.8 | 29.0 | 29.1 | 29.2 | 29.3 | 29.3 | 29.4 |
| Condenser line gas density | kg/m³ | 155.3 | | 133.8 | 134.8 | 135.4 | 136.2 | 136.6 | 136.9 | 137.2 |

Example 4 (Ternary Blends of R-1132a/R-32/R-1234yf Comprising 7 Weight % R-1132a)

| Results | | R410A | Nominal composition (weight %) | | | | | | |
|---|---|---|---|---|---|---|---|---|---|
| | | | R-1132a | 7 | 7 | 7 | 7 | 7 | 7 | 7 |
| | | | R-32 | 36 | 38 | 40 | 42 | 44 | 46 | 48 |
| | | | R-1234yf | 57 | 55 | 53 | 51 | 49 | 47 | 45 |
| GWP (AR4 basis) | | 2107 | | 244 | 257 | 271 | 284 | 298 | 311 | 325 |
| Cooling COP relative to reference | | 100.0% | | 105.1% | 104.8% | 104.6% | 104.5% | 104.3% | 104.1% | 103.9% |
| Cooling Capacity relative to reference | | 100.0% | | 87.8% | 89.4% | 90.8% | 92.3% | 93.8% | 95.1% | 96.5% |
| Compressor discharge temperature difference | K | 0.0 | | −2.9 | −1.8 | −1.0 | −0.1 | 0.8 | 1.6 | 2.5 |
| Pressure ratio | | 3.32 | | 3.48 | 3.48 | 3.47 | 3.46 | 3.45 | 3.44 | 3.43 |
| Volumetric efficiency | | 94.5% | | 93.6% | 93.7% | 93.8% | 93.9% | 93.9% | 94.0% | 94.1% |
| Condenser glide | K | 0.2 | | 6.3 | 6.1 | 5.7 | 5.4 | 5.1 | 4.8 | 4.6 |
| Evaporator glide | K | 0.1 | | 6.6 | 6.4 | 6.1 | 5.8 | 5.6 | 5.3 | 5.0 |
| Evaporator inlet temperature | °C | 7.2 | | 3.9 | 4.0 | 4.2 | 4.3 | 4.4 | 4.6 | 4.7 |
| Condenser exit temperature | °C | 46.0 | | 43.0 | 43.1 | 43.3 | 43.4 | 43.6 | 43.7 | 43.8 |
| Condenser pressure | bar | 33.7 | | 28.9 | 29.5 | 29.9 | 30.4 | 30.8 | 31.2 | 31.6 |
| Evaporator pressure | bar | 10.2 | | 8.3 | 8.5 | 8.6 | 8.8 | 8.9 | 9.1 | 9.2 |
| Refrigeration effect | kJ/kg | 151.2 | | 157.0 | 159.1 | 161.1 | 163.1 | 165.2 | 167.3 | 169.4 |
| Coefficient of Performance (COP) | | 2.88 | | 3.03 | 3.02 | 3.02 | 3.01 | 3.01 | 3.00 | 3.00 |
| Discharge temperature | °C | 105.5 | | 102.7 | 103.7 | 104.5 | 105.4 | 106.3 | 107.2 | 108.0 |
| Mass flow rate | kg/hr | 251 | | 242 | 239 | 236 | 233 | 230 | 227 | 224 |
| Volumetric flow rate | m³/hr | 7.28 | | 8.29 | 8.14 | 8.01 | 7.88 | 7.76 | 7.65 | 7.54 |
| Volumetric cooling capacity | kJ/m³ | 5226 | | 4588 | 4672 | 4747 | 4824 | 4899 | 4971 | 5042 |
| Suction line pressure drop | Pa/m | 163 | | 181 | 176 | 172 | 167 | 163 | 159 | 156 |
| Suction line gas density | kg/m³ | 34.6 | | 29.2 | 29.4 | 29.5 | 29.6 | 29.7 | 29.7 | 29.8 |
| Condenser line gas density | kg/m³ | 155.3 | | 136.7 | 137.9 | 138.4 | 139.0 | 139.5 | 139.8 | 140.0 |

Example 5 (Ternary Blends of R-1132a/R-32/R-1234yf Comprising 8 Weight % of R-1132a)

| Results | | R410A | Nominal composition (weight %) | | | | | | | |
|---|---|---|---|---|---|---|---|---|---|---|
| | | | R-1132a | 8 | 8 | 8 | 8 | 8 | 8 | 8 |
| | | | R-32 | 36 | 38 | 40 | 42 | 44 | 46 | 48 |
| | | | R-1234yf | 56 | 54 | 52 | 50 | 48 | 46 | 44 |
| GWP (AR4 basis) | | 2107 | | 244 | 257 | 271 | 284 | 298 | 311 | 325 |
| Cooling COP relative to reference | | 100.0% | | 104.6% | 104.4% | 104.2% | 104.0% | 103.9% | 103.7% | 103.6% |
| Cooling Capacity relative to reference | | 100.0% | | 89.0% | 90.6% | 92.1% | 93.5% | 94.9% | 96.3% | 97.6% |
| Compressor discharge temperature difference | K | 0.0 | | −2.3 | −1.5 | −0.6 | 0.2 | 1.1 | 2.0 | 2.8 |
| Pressure ratio | | 3.32 | | 3.48 | 3.47 | 3.46 | 3.45 | 3.44 | 3.44 | 3.43 |
| Volumetric efficiency | | 94.5% | | 93.7% | 93.7% | 93.8% | 93.9% | 94.0% | 94.0% | 94.1% |
| Condenser glide | K | 0.2 | | 6.4 | 6.1 | 5.8 | 5.4 | 5.1 | 4.8 | 4.6 |
| Evaporator glide | K | 0.1 | | 6.8 | 6.6 | 6.3 | 6.0 | 5.7 | 5.5 | 5.2 |
| Evaporator inlet temperature | ° C. | 7.2 | | 3.8 | 3.9 | 4.1 | 4.2 | 4.3 | 4.5 | 4.6 |
| Condenser exit temperature | ° C. | 46.0 | | 42.9 | 43.0 | 43.2 | 43.4 | 43.5 | 43.7 | 43.8 |
| Condenser pressure | bar | 33.7 | | 29.5 | 29.9 | 30.4 | 30.8 | 31.3 | 31.7 | 32.1 |
| Evaporator pressure | bar | 10.2 | | 8.5 | 8.6 | 8.8 | 8.9 | 9.1 | 9.2 | 9.4 |
| Refrigeration effect | kJ/kg | 151.2 | | 157.0 | 159.0 | 161.0 | 162.9 | 165.0 | 167.1 | 169.2 |
| Coefficient of Performance (COP) | | 2.88 | | 3.02 | 3.01 | 3.00 | 3.00 | 2.99 | 2.99 | 2.98 |
| Discharge temperature | ° C. | 105.5 | | 103.2 | 104.1 | 105.0 | 105.8 | 106.7 | 107.5 | 108.4 |
| Mass flow rate | kg/hr | 251 | | 242 | 239 | 236 | 233 | 230 | 228 | 225 |
| Volumetric flow rate | m$^3$/hr | 7.28 | | 8.17 | 8.03 | 7.90 | 7.78 | 7.67 | 7.56 | 7.45 |
| Volumetric cooling capacity | kJ/m$^3$ | 5226 | | 4653 | 4734 | 4812 | 4884 | 4959 | 5031 | 5102 |
| Suction line pressure drop | Pa/m | 163 | | 179 | 174 | 169 | 165 | 161 | 158 | 154 |
| Suction line gas density | kg/m$^3$ | 34.6 | | 29.6 | 29.8 | 29.9 | 30.0 | 30.1 | 30.1 | 30.1 |
| Condenser line gas density | kg/m$^3$ | 155.3 | | 139.8 | 140.6 | 141.4 | 141.8 | 142.2 | 142.5 | 142.7 |

Example 6 (Quaternary Blends of R-1132a/CO$_2$/R-32/R-1234yf Comprising 4 Weight % of R-1132a and 3 Weight % of CO$_2$ (R-744))

| Results | | R410A | Nominal composition (weight %) | | | | | | | |
|---|---|---|---|---|---|---|---|---|---|---|
| | | | R-1132a | 4 | 4 | 4 | 4 | 4 | 4 | 4 |
| | | | R-744 | 3 | 3 | 3 | 3 | 3 | 3 | 3 |
| | | | R-32 | 36 | 38 | 40 | 42 | 44 | 46 | 48 |
| | | | R-1234yf | 57 | 55 | 53 | 51 | 49 | 47 | 45 |
| GWP (AR4 basis) | | 2107 | | 244 | 257 | 271 | 284 | 298 | 311 | 325 |
| Cooling COP relative to reference | | 100.0% | | 104.3% | 104.1% | 103.9% | 103.7% | 103.5% | 103.3% | 103.1% |
| Cooling Capacity relative to reference | | 100.0% | | 91.2% | 92.8% | 94.2% | 95.6% | 97.0% | 98.4% | 99.7% |
| Compressor discharge temperature difference | K | 0.0 | | −0.3 | 0.6 | 1.4 | 2.3 | 3.2 | 4.1 | 4.9 |
| Pressure ratio | | 3.32 | | 3.52 | 3.51 | 3.50 | 3.49 | 3.48 | 3.48 | 3.47 |
| Volumetric efficiency | | 94.5% | | 93.6% | 93.7% | 93.8% | 93.9% | 93.9% | 94.0% | 94.1% |
| Condenser glide | K | 0.2 | | 7.9 | 7.6 | 7.2 | 6.8 | 6.5 | 6.2 | 5.9 |
| Evaporator glide | K | 0.1 | | 7.5 | 7.2 | 6.9 | 6.6 | 6.4 | 6.1 | 5.8 |
| Evaporator inlet temperature | ° C. | 7.2 | | 3.5 | 3.6 | 3.8 | 3.9 | 4.0 | 4.2 | 4.3 |
| Condenser exit temperature | ° C. | 46.0 | | 42.2 | 42.3 | 42.5 | 42.7 | 42.9 | 43.0 | 43.1 |
| Condenser pressure | bar | 33.7 | | 30.3 | 30.8 | 31.2 | 31.6 | 32.1 | 32.5 | 32.9 |
| Evaporator pressure | bar | 10.2 | | 8.6 | 8.8 | 8.9 | 9.1 | 9.2 | 9.3 | 9.5 |
| Refrigeration effect | kJ/kg | 151.2 | | 160.4 | 162.4 | 164.4 | 166.4 | 168.5 | 170.6 | 172.7 |
| Coefficient of Performance (COP) | | 2.88 | | 3.01 | 3.00 | 2.99 | 2.99 | 2.98 | 2.98 | 2.97 |
| Discharge temperature | ° C. | 105.5 | | 105.2 | 106.1 | 107.0 | 107.8 | 108.7 | 109.6 | 110.5 |
| Mass flow rate | kg/hr | 251 | | 237 | 234 | 231 | 228 | 226 | 223 | 220 |
| Volumetric flow rate | m$^3$/hr | 7.28 | | 7.97 | 7.84 | 7.72 | 7.61 | 7.50 | 7.39 | 7.29 |
| Volumetric cooling capacity | kJ/m$^3$ | 5226 | | 4768 | 4849 | 4922 | 4997 | 5070 | 5142 | 5212 |
| Suction line pressure drop | Pa/m | 163 | | 172 | 167 | 163 | 159 | 155 | 152 | 148 |
| Suction line gas density | kg/m$^3$ | 34.6 | | 29.7 | 29.8 | 29.9 | 30.0 | 30.1 | 30.1 | 30.2 |
| Condenser line gas density | kg/m$^3$ | 155.3 | | 141.7 | 142.5 | 143.0 | 143.6 | 144.1 | 144.4 | 144.6 |

Example 7 (Quaternary Blends of R-1132a/CO$_2$/R-32/R-1234yf Comprising 5 Weight % of R-1132a and 3 Weight % of CO$_2$ (R-744))

| Results | | R410A | Nominal composition (weight %) | | | | | | |
|---|---|---|---|---|---|---|---|---|---|
| | | | R-1132a | 5 | 5 | 5 | 5 | 5 | 5 | 5 |
| | | | R-744 | 3 | 3 | 3 | 3 | 3 | 3 | 3 |
| | | | R-32 | 36 | 38 | 40 | 42 | 44 | 46 | 48 |
| | | | R-1234yf | 56 | 54 | 52 | 50 | 48 | 46 | 44 |
| GWP (AR4 basis) | | 2107 | | 244 | 257 | 271 | 284 | 298 | 311 | 325 |
| Cooling COP relative to reference | | 100.0% | | 103.9% | 103.7% | 103.4% | 103.3% | 103.1% | 102.9% | 102.7% |
| Cooling Capacity relative to reference | | 100.0% | | 92.4% | 94.0% | 95.5% | 96.8% | 98.2% | 99.7% | 101.0% |
| Compressor discharge temperature difference | K | 0.0 | | 0.1 | 1.0 | 1.9 | 2.7 | 3.6 | 4.5 | 5.4 |
| Pressure ratio | | 3.32 | | 3.51 | 3.51 | 3.50 | 3.49 | 3.48 | 3.48 | 3.47 |
| Volumetric efficiency | | 94.5% | | 93.6% | 93.7% | 93.8% | 93.9% | 94.0% | 94.0% | 94.1% |
| Condenser glide | K | 0.2 | | 8.0 | 7.7 | 7.3 | 6.9 | 6.6 | 6.3 | 6.0 |
| Evaporator glide | K | 0.1 | | 7.7 | 7.4 | 7.1 | 6.8 | 6.5 | 6.2 | 5.9 |
| Evaporator inlet temperature | °C. | 7.2 | | 3.4 | 3.5 | 3.7 | 3.8 | 4.0 | 4.1 | 4.3 |
| Condenser exit temperature | °C. | 46.0 | | 42.1 | 42.3 | 42.5 | 42.7 | 42.8 | 42.9 | 43.1 |
| Condenser pressure | bar | 33.7 | | 30.8 | 31.3 | 31.7 | 32.1 | 32.6 | 33.0 | 33.4 |
| Evaporator pressure | bar | 10.2 | | 8.8 | 8.9 | 9.1 | 9.2 | 9.4 | 9.5 | 9.6 |
| Refrigeration effect | kJ/kg | 151.2 | | 160.2 | 162.3 | 164.3 | 166.2 | 168.3 | 170.5 | 172.6 |
| Coefficient of Performance (COP) | | 2.88 | | 2.99 | 2.99 | 2.98 | 2.98 | 2.97 | 2.96 | 2.96 |
| Discharge temperature | °C. | 105.5 | | 105.6 | 106.6 | 107.4 | 108.2 | 109.1 | 110.0 | 110.9 |
| Mass flow rate | kg/hr | 251 | | 237 | 234 | 231 | 229 | 226 | 223 | 220 |
| Volumetric flow rate | m$^3$/hr | 7.28 | | 7.87 | 7.74 | 7.62 | 7.51 | 7.41 | 7.30 | 7.20 |
| Volumetric cooling capacity | kJ/m$^3$ | 5226 | | 4830 | 4912 | 4988 | 5060 | 5133 | 5208 | 5278 |
| Suction line pressure drop | Pa/m | 163 | | 169 | 165 | 161 | 157 | 154 | 150 | 147 |
| Suction line gas density | kg/m$^3$ | 34.6 | | 30.1 | 30.3 | 30.4 | 30.4 | 30.5 | 30.5 | 30.6 |
| Condenser line gas density | kg/m$^3$ | 155.3 | | 144.4 | 145.5 | 146.2 | 146.6 | 147.1 | 147.6 | 147.8 |

Example 8 (Quaternary Blends of R-1132a/CO$_2$/R-32/R-1234yf Comprising 6 Weight % of R-1132a and 3 Weight % of CO$_2$ (R-744))

| Results | | R410A | Nominal composition (weight %) | | | | | | |
|---|---|---|---|---|---|---|---|---|---|
| | | | R-1132a | 6 | 6 | 6 | 6 | 6 | 6 | 6 |
| | | | R-744 | 3 | 3 | 3 | 3 | 3 | 3 | 3 |
| | | | R-32 | 36 | 38 | 40 | 42 | 44 | 46 | 48 |
| | | | R-1234yf | 55 | 53 | 51 | 49 | 47 | 45 | 43 |
| GWP (AR4 basis) | | 2107 | | 244 | 257 | 271 | 284 | 298 | 311 | 325 |
| Cooling COP relative to reference | | 100.0% | | 103.5% | 103.2% | 103.0% | 102.8% | 102.6% | 102.5% | 102.3% |
| Cooling Capacity relative to reference | | 100.0% | | 93.7% | 95.1% | 96.6% | 98.0% | 99.4% | 100.8% | 102.2% |
| Compressor discharge temperature difference | K | 0.0 | | 0.5 | 1.4 | 2.2 | 3.1 | 4.0 | 4.8 | 5.7 |
| Pressure ratio | | 3.32 | | 3.51 | 3.50 | 3.49 | 3.48 | 3.48 | 3.47 | 3.46 |
| Volumetric efficiency | | 94.5% | | 93.7% | 93.7% | 93.8% | 93.9% | 94.0% | 94.0% | 94.1% |
| Condenser glide | K | 0.2 | | 8.2 | 7.7 | 7.3 | 6.9 | 6.6 | 6.3 | 6.1 |
| Evaporator glide | K | 0.1 | | 7.9 | 7.6 | 7.3 | 7.0 | 6.7 | 6.4 | 6.1 |
| Evaporator inlet temperature | °C. | 7.2 | | 3.3 | 3.4 | 3.6 | 3.7 | 3.9 | 4.0 | 4.2 |
| Condenser exit temperature | °C. | 46.0 | | 42.0 | 42.3 | 42.5 | 42.6 | 42.8 | 43.0 | 43.1 |
| Condenser pressure | bar | 33.7 | | 31.3 | 31.8 | 32.2 | 32.7 | 33.1 | 33.5 | 33.9 |
| Evaporator pressure | bar | 10.2 | | 8.9 | 9.1 | 9.2 | 9.4 | 9.5 | 9.7 | 9.8 |
| Refrigeration effect | kJ/kg | 151.2 | | 160.2 | 162.1 | 164.1 | 166.1 | 168.1 | 170.2 | 172.4 |
| Coefficient of Performance (COP) | | 2.88 | | 2.98 | 2.98 | 2.97 | 2.96 | 2.96 | 2.95 | 2.95 |
| Discharge temperature | °C. | 105.5 | | 106.0 | 106.9 | 107.8 | 108.6 | 109.5 | 110.4 | 111.3 |
| Mass flow rate | kg/hr | 251 | | 237 | 235 | 232 | 229 | 226 | 223 | 221 |
| Volumetric flow rate | m$^3$/hr | 7.28 | | 7.76 | 7.65 | 7.53 | 7.42 | 7.32 | 7.22 | 7.12 |
| Volumetric cooling capacity | kJ/m$^3$ | 5226 | | 4897 | 4971 | 5048 | 5123 | 5196 | 5268 | 5340 |
| Suction line pressure drop | Pa/m | 163 | | 167 | 163 | 159 | 156 | 152 | 148 | 145 |
| Suction line gas density | kg/m$^3$ | 34.6 | | 30.6 | 30.7 | 30.8 | 30.8 | 30.9 | 31.0 | 31.0 |
| Condenser line gas density | kg/m$^3$ | 155.3 | | 147.6 | 148.4 | 149.2 | 149.7 | 150.2 | 150.5 | 150.8 |

Example 9 (Quaternary Blends of R-1132a/CO₂/R-32/R-1234yf Comprising 7 Weight % of R-1132a and 3 Weight % of CO₂ (R-744))

| Results | | R410A | Nominal composition (weight %) | | | | | | |
|---|---|---|---|---|---|---|---|---|---|
| | | | R-1132a | 7 | 7 | 7 | 7 | 7 | 7 | 7 |
| | | | R-744 | 3 | 3 | 3 | 3 | 3 | 3 | 3 |
| | | | R-32 | 36 | 38 | 40 | 42 | 44 | 46 | 48 |
| | | | R-1234yf | 54 | 52 | 50 | 48 | 46 | 44 | 42 |
| GWP (AR4 basis) | | 2107 | | 244 | 257 | 271 | 284 | 298 | 311 | 325 |
| Cooling COP relative to reference | | 100.0% | | 103.0% | 102.7% | 102.6% | 102.4% | 102.2% | 102.0% | 101.9% |
| Cooling Capacity relative to reference | | 100.0% | | 94.8% | 96.3% | 97.8% | 99.3% | 100.7% | 102.1% | 103.4% |
| Compressor discharge temperature difference | K | 0.0 | | 0.9 | 1.8 | 2.7 | 3.5 | 4.4 | 5.3 | 6.1 |
| Pressure ratio | | 3.32 | | 3.51 | 3.50 | 3.49 | 3.48 | 3.47 | 3.47 | 3.46 |
| Volumetric efficiency | | 94.5% | | 93.7% | 93.8% | 93.8% | 93.9% | 94.0% | 94.1% | 94.1% |
| Condenser glide | K | 0.2 | | 8.1 | 7.6 | 7.4 | 7.0 | 6.7 | 6.4 | 6.1 |
| Evaporator glide | K | 0.1 | | 8.0 | 7.7 | 7.4 | 7.1 | 6.8 | 6.5 | 6.2 |
| Evaporator inlet temperature | °C | 7.2 | | 3.2 | 3.4 | 3.5 | 3.7 | 3.8 | 4.0 | 4.1 |
| Condenser exit temperature | °C | 46.0 | | 42.1 | 42.3 | 42.4 | 42.6 | 42.8 | 42.9 | 43.1 |
| Condenser pressure | bar | 33.7 | | 31.8 | 32.3 | 32.8 | 33.2 | 33.6 | 34.1 | 34.4 |
| Evaporator pressure | bar | 10.2 | | 9.1 | 9.2 | 9.4 | 9.5 | 9.7 | 9.8 | 10.0 |
| Refrigeration effect | kJ/kg | 151.2 | | 159.9 | 161.8 | 163.9 | 165.9 | 168.0 | 170.1 | 172.2 |
| Coefficient of Performance (COP) | | 2.88 | | 2.97 | 2.96 | 2.96 | 2.95 | 2.95 | 2.94 | 2.94 |
| Discharge temperature | °C | 105.5 | | 106.4 | 107.3 | 108.2 | 109.1 | 109.9 | 110.8 | 111.6 |
| Mass flow rate | kg/hr | 251 | | 238 | 235 | 232 | 229 | 226 | 224 | 221 |
| Volumetric flow rate | m³/hr | 7.28 | | 7.67 | 7.56 | 7.44 | 7.33 | 7.23 | 7.13 | 7.04 |
| Volumetric cooling capacity | kJ/m³ | 5226 | | 4954 | 5030 | 5113 | 5188 | 5262 | 5334 | 5403 |
| Suction line pressure drop | Pa/m | 163 | | 166 | 162 | 157 | 154 | 150 | 147 | 143 |
| Suction line gas density | kg/m³ | 34.6 | | 31.0 | 31.1 | 31.2 | 31.3 | 31.3 | 31.4 | 31.4 |
| Condenser line gas density | kg/m³ | 155.3 | | 150.7 | 151.7 | 152.6 | 153.1 | 153.6 | 153.9 | 154.0 |

Example 10 (Quaternary Blends of R-1132a/CO₂/R-32/R-1234yf Comprising 8 Weight % of R-1132a and 3 Weight % of CO₂ (R-744))

| | | Nominal composition (weight %) | | | | | | |
|---|---|---|---|---|---|---|---|---|
| R-1132a | | 8 | 8 | 8 | 8 | 8 | 8 | 8 |
| R-744 | | 3 | 3 | 3 | 3 | 3 | 3 | 3 |
| R-32 | | 36 | 38 | 40 | 42 | 44 | 46 | 48 |
| R-1234yf | | 53 | 51 | 49 | 47 | 45 | 43 | 41 |
| Results | R410A | | | | | | | |
| GWP (AR4 basis) | 2107 | 244 | 257 | 271 | 284 | 298 | 311 | 325 |
| Cooling COP relative to reference | | 100.0% | 102.7% | 102.3% | 102.1% | 101.9% | 101.9% | 101.6% | 101.5% |
| Cooling Capacity relative to reference | | 100.0% | 96.1% | 97.5% | 99.0% | 100.5% | 102.0% | 103.2% | 104.6% |
| Compressor discharge temperature difference | K | 0.0 | 1.3 | 2.2 | 3.1 | 3.9 | 4.8 | 5.5 | 6.5 |
| Pressure ratio | | 3.32 | 3.50 | 3.49 | 3.49 | 3.48 | 3.47 | 3.46 | 3.45 |
| Volumetric efficiency | | 94.5% | 93.7% | 93.8% | 93.9% | 93.9% | 94.0% | 94.1% | 94.2% |
| Condenser glide | K | 0.2 | 8.2 | 7.7 | 7.4 | 7.0 | 6.9 | 6.3 | 6.1 |
| Evaporator glide | K | 0.1 | 8.2 | 7.9 | 7.6 | 7.2 | 7.0 | 6.6 | 6.3 |
| Evaporator inlet temperature | °C | 7.2 | 3.1 | 3.3 | 3.4 | 3.6 | 3.7 | 3.9 | 4.0 |
| Condenser exit temperature | °C | 46.0 | 42.0 | 42.2 | 42.4 | 42.6 | 42.7 | 42.9 | 43.1 |
| Condenser pressure | bar | 33.7 | 32.3 | 32.8 | 33.3 | 33.7 | 34.2 | 34.5 | 35.0 |
| Evaporator pressure | bar | 10.2 | 9.2 | 9.4 | 9.5 | 9.7 | 9.8 | 10.0 | 10.1 |
| Refrigeration effect | kJ/kg | 151.2 | 159.9 | 161.7 | 163.7 | 165.7 | 167.9 | 169.7 | 171.9 |
| Coefficient of Performance (COP) | | 2.88 | 2.96 | 2.95 | 2.94 | 2.94 | 2.94 | 2.93 | 2.93 |
| Discharge temperature | °C | 105.5 | 106.8 | 107.7 | 108.6 | 109.4 | 110.3 | 111.1 | 112.0 |
| Mass flow rate | kg/hr | 251 | 238 | 235 | 232 | 229 | 226 | 224 | 221 |
| Volumetric flow rate | m³/hr | 7.28 | 7.57 | 7.46 | 7.35 | 7.24 | 7.13 | 7.05 | 6.95 |
| Volumetric cooling capacity | kJ/m³ | 5226 | 5022 | 5097 | 5175 | 5249 | 5331 | 5392 | 5466 |
| Suction line pressure drop | Pa/m | 163 | 163 | 160 | 156 | 152 | 148 | 145 | 142 |
| Suction line gas density | kg/m³ | 34.6 | 31.4 | 31.5 | 31.6 | 31.7 | 31.7 | 31.8 | 31.8 |
| Condenser line gas density | kg/m³ | 155.3 | 154.0 | 155.1 | 155.9 | 156.5 | 156.9 | 157.0 | 157.3 |

Example 11 (Quaternary Blends of R-1132a/CO₂/R-32/R-1234yf Comprising 9 Weight % of R-1132a and 3 Weight % of $CO_2$ (R-744))

| Nominal composition (weight %) | | | | | | | | |
|---|---|---|---|---|---|---|---|---|
| R-1132a | | 9 | 9 | 9 | 9 | 9 | 9 | 9 |
| R-744 | | 3 | 3 | 3 | 3 | 3 | 3 | 3 |
| R-32 | | 36 | 38 | 40 | 42 | 44 | 46 | 48 |
| R-1234yf | | 52 | 50 | 48 | 46 | 44 | 42 | 40 |

| Results | | R410A | | | | | | | |
|---|---|---|---|---|---|---|---|---|---|
| GWP (AR4 basis) | | 2107 | 244 | 257 | 271 | 284 | 298 | 311 | 325 |
| Cooling COP relative to reference | | 100.0% | 102.0% | 101.7% | 101.7% | 101.5% | 101.3% | 101.2% | 101.1% |
| Cooling Capacity relative to reference | | 100.0% | 97.2% | 98.6% | 100.2% | 101.6% | 103.1% | 104.4% | 105.8% |
| Compressor discharge temperature difference | K | 0.0 | 1.7 | 2.6 | 3.4 | 4.2 | 5.1 | 5.9 | 6.8 |
| Pressure ratio | | 3.32 | 3.50 | 3.49 | 3.48 | 3.47 | 3.46 | 3.46 | 3.45 |
| Volumetric efficiency | | 94.5% | 93.7% | 93.8% | 93.9% | 94.0% | 94.0% | 94.1% | 94.2% |
| Condenser glide | K | 0.2 | 8.1 | 7.7 | 7.4 | 7.0 | 6.7 | 6.4 | 6.1 |
| Evaporator glide | K | 0.1 | 8.3 | 8.0 | 7.7 | 7.4 | 7.1 | 6.8 | 6.5 |
| Evaporator inlet temperature | °C. | 7.2 | 3.1 | 3.2 | 3.4 | 3.5 | 3.7 | 3.8 | 4.0 |
| Condenser exit temperature | °C. | 46.0 | 42.0 | 42.3 | 42.4 | 42.6 | 42.8 | 42.9 | 43.1 |
| Condenser pressure | bar | 33.7 | 32.9 | 33.4 | 33.8 | 34.2 | 34.7 | 35.1 | 35.5 |
| Evaporator pressure | bar | 10.2 | 9.4 | 9.6 | 9.7 | 9.9 | 10.0 | 10.2 | 10.3 |
| Refrigeration effect | kJ/kg | 151.2 | 159.6 | 161.4 | 163.4 | 165.4 | 167.5 | 169.6 | 171.7 |
| Coefficient of Performance (COP) | | 2.88 | 2.94 | 2.93 | 2.93 | 2.93 | 2.92 | 2.92 | 2.91 |
| Discharge temperature | °C. | 105.5 | 107.3 | 108.2 | 109.0 | 109.7 | 110.7 | 111.5 | 112.3 |
| Mass flow rate | kg/hr | 251 | 238 | 236 | 233 | 230 | 227 | 224 | 221 |
| Volumetric flow rate | m³/hr | 7.28 | 7.49 | 7.38 | 7.26 | 7.16 | 7.06 | 6.97 | 6.88 |
| Volumetric cooling capacity | kJ/m³ | 5226 | 5079 | 5155 | 5235 | 5308 | 5385 | 5458 | 5528 |
| Suction line pressure drop | Pa/m | 163 | 162 | 158 | 154 | 151 | 147 | 144 | 141 |
| Suction line gas density | kg/m³ | 34.6 | 31.8 | 31.9 | 32.0 | 32.1 | 32.2 | 32.2 | 32.2 |
| Condenser line gas density | kg/m³ | 155.3 | 157.6 | 158.7 | 159.3 | 159.7 | 160.4 | 160.7 | 160.7 |

Example 12 (Quaternary Blends of R-1132a/CO₂/R-32/R-1234yf Comprising 10 Weight % of R-1132a and 3 Weight % of $CO_2$ (R-744))

| Nominal composition (weight %) | | | | | | | | |
|---|---|---|---|---|---|---|---|---|
| R-1132a | | 10 | 10 | 10 | 10 | 10 | 10 | 10 |
| R-744 | | 3 | 3 | 3 | 3 | 3 | 3 | 3 |
| R-32 | | 36 | 38 | 40 | 42 | 44 | 46 | 48 |
| R-1234yf | | 51 | 49 | 47 | 45 | 43 | 41 | 39 |

| Results | | R410A | | | | | | | |
|---|---|---|---|---|---|---|---|---|---|
| GWP (AR4 basis) | | 2107 | 244 | 257 | 271 | 284 | 298 | 311 | 325 |
| Cooling COP relative to reference | | 100.0% | 101.4% | 101.3% | 101.2% | 101.1% | 100.9% | 100.8% | 100.7% |
| Cooling Capacity relative to reference | | 100.0% | 98.2% | 99.8% | 101.3% | 102.8% | 104.2% | 105.6% | 107.0% |
| Compressor discharge temperature difference | K | 0.0 | 2.1 | 2.9 | 3.8 | 4.6 | 5.4 | 6.3 | 7.1 |
| Pressure ratio | | 3.32 | 3.50 | 3.48 | 3.48 | 3.47 | 3.46 | 3.45 | 3.44 |
| Volumetric efficiency | | 94.5% | 93.8% | 93.8% | 93.9% | 94.0% | 94.1% | 94.1% | 94.2% |
| Condenser glide | K | 0.2 | 7.9 | 7.6 | 7.3 | 7.0 | 6.7 | 6.4 | 6.1 |
| Evaporator glide | K | 0.1 | 8.4 | 8.1 | 7.8 | 7.5 | 7.2 | 6.9 | 6.6 |
| Evaporator inlet temperature | °C. | 7.2 | 3.0 | 3.2 | 3.3 | 3.5 | 3.6 | 3.8 | 3.9 |
| Condenser exit temperature | °C. | 46.0 | 42.2 | 42.3 | 42.4 | 42.6 | 42.8 | 42.9 | 43.1 |
| Condenser pressure | bar | 33.7 | 33.4 | 33.9 | 34.3 | 34.8 | 35.2 | 35.6 | 36.0 |
| Evaporator pressure | bar | 10.2 | 9.6 | 9.7 | 9.9 | 10.0 | 10.2 | 10.3 | 10.5 |
| Refrigeration effect | kJ/kg | 151.2 | 159.1 | 161.0 | 163.2 | 165.1 | 167.2 | 169.3 | 171.4 |
| Coefficient of Performance (COP) | | 2.88 | 2.92 | 2.92 | 2.92 | 2.91 | 2.91 | 2.90 | 2.90 |
| Discharge temperature | °C. | 105.5 | 107.7 | 108.5 | 109.3 | 110.2 | 111.0 | 111.8 | 112.6 |
| Mass flow rate | kg/hr | 251 | 239 | 236 | 233 | 230 | 227 | 225 | 222 |
| Volumetric flow rate | m³/hr | 7.28 | 7.41 | 7.29 | 7.18 | 7.08 | 6.98 | 6.89 | 6.80 |
| Volumetric cooling capacity | kJ/m³ | 5226 | 5131 | 5213 | 5296 | 5372 | 5446 | 5519 | 5589 |
| Suction line pressure drop | Pa/m | 163 | 160 | 157 | 153 | 149 | 146 | 142 | 139 |
| Suction line gas density | kg/m³ | 34.6 | 32.3 | 32.4 | 32.5 | 32.5 | 32.6 | 32.6 | 32.6 |
| Condenser line gas density | kg/m³ | 155.3 | 161.2 | 162.0 | 162.9 | 163.5 | 164.0 | 164.2 | 164.3 |

Example 13 (Quaternary Blends of R-1132a/CO$_2$/R-32/R-1234yf Comprising 4 Weight % of R-1132a and 4 Weight % of CO$_2$ (R-744))

| Nominal composition (weight %) | | | | | | | | |
|---|---|---|---|---|---|---|---|---|
| R-1132a | | | 4 | 4 | 4 | 4 | 4 | 4 | 4 |
| R-744 | | | 4 | 4 | 4 | 4 | 4 | 4 | 4 |
| R-32 | | | 36 | 38 | 40 | 42 | 44 | 46 | 48 |
| R-1234yf | | | 56 | 54 | 52 | 50 | 48 | 46 | 44 |

| Results | | R410A | | | | | | | |
|---|---|---|---|---|---|---|---|---|---|
| GWP (AR4 basis) | | 2107 | 244 | 257 | 271 | 284 | 298 | 311 | 325 |
| Cooling COP relative to reference | | 100.0% | 103.7% | 103.4% | 103.2% | 103.0% | 102.8% | 102.6% | 102.4% |
| Cooling Capacity relative to reference | | 100.0% | 93.6% | 95.1% | 96.5% | 98.0% | 99.4% | 100.7% | 102.0% |
| Compressor discharge temperature difference | K | 0.0 | 0.9 | 1.8 | 2.6 | 3.5 | 4.4 | 5.3 | 6.1 |
| Pressure ratio | | 3.32 | 3.53 | 3.52 | 3.51 | 3.50 | 3.49 | 3.49 | 3.48 |
| Volumetric efficiency | | 94.5% | 93.6% | 93.7% | 93.8% | 93.9% | 93.9% | 94.0% | 94.1% |
| Condenser glide | K | 0.2 | 8.5 | 8.1 | 7.7 | 7.4 | 7.0 | 6.7 | 6.4 |
| Evaporator glide | K | 0.1 | 8.0 | 7.7 | 7.4 | 7.1 | 6.8 | 6.5 | 6.2 |
| Evaporator inlet temperature | ° C. | 7.2 | 3.2 | 3.4 | 3.5 | 3.7 | 3.8 | 4.0 | 4.1 |
| Condenser exit temperature | ° C. | 46.0 | 41.9 | 42.1 | 42.2 | 42.4 | 42.6 | 42.7 | 42.9 |
| Condenser pressure | bar | 33.7 | 31.2 | 31.7 | 32.1 | 32.6 | 33.0 | 33.4 | 33.8 |
| Evaporator pressure | bar | 10.2 | 8.9 | 9.0 | 9.2 | 9.3 | 9.5 | 9.6 | 9.7 |
| Refrigeration effect | kJ/kg | 151.2 | 161.4 | 163.3 | 165.3 | 167.3 | 169.4 | 171.5 | 173.6 |
| Coefficient of Performance (COP) | | 2.88 | 2.99 | 2.98 | 2.97 | 2.97 | 2.96 | 2.96 | 2.95 |
| Discharge temperature | ° C. | 105.5 | 106.4 | 107.3 | 108.2 | 109.1 | 109.9 | 110.8 | 111.7 |
| Mass flow rate | kg/hr | 251 | 236 | 233 | 230 | 227 | 224 | 222 | 219 |
| Volumetric flow rate | m$^3$/hr | 7.28 | 7.77 | 7.65 | 7.54 | 7.43 | 7.32 | 7.22 | 7.13 |
| Volumetric cooling capacity | kJ/m$^3$ | 5226 | 4891 | 4968 | 5044 | 5119 | 5192 | 5263 | 5332 |
| Suction line pressure drop | Pa/m | 163 | 167 | 162 | 159 | 155 | 151 | 148 | 145 |
| Suction line gas density | kg/m$^3$ | 34.6 | 30.3 | 30.4 | 30.5 | 30.6 | 30.6 | 30.7 | 30.7 |
| Condenser line gas density | kg/m$^3$ | 155.3 | 146.1 | 146.9 | 147.6 | 148.2 | 148.7 | 149.1 | 149.2 |

Example 14 (Quaternary Blends of R-1132a/CO$_2$/R-32/R-1234yf Comprising 5 Weight % of R-1132a and 4 Weight % of CO$_2$ (R-744))

| Nominal composition (weight %) | | | | | | | | |
|---|---|---|---|---|---|---|---|---|
| R-1132a | | | 5 | 5 | 5 | 5 | 5 | 5 | 5 |
| R-744 | | | 4 | 4 | 4 | 4 | 4 | 4 | 4 |
| R-32 | | | 36 | 38 | 40 | 42 | 44 | 46 | 48 |
| R-1234yf | | | 55 | 53 | 51 | 49 | 47 | 45 | 43 |

| Results | | R410A | | | | | | | |
|---|---|---|---|---|---|---|---|---|---|
| GWP (AR4 basis) | | 2107 | 244 | 257 | 271 | 284 | 298 | 311 | 325 |
| Cooling COP relative to reference | | 100.0% | 103.2% | 103.0% | 102.7% | 102.5% | 102.4% | 102.2% | 102.0% |
| Cooling Capacity relative to reference | | 100.0% | 94.8% | 96.3% | 97.8% | 99.2% | 100.7% | 101.9% | 103.3% |
| Compressor discharge temperature difference | K | 0.0 | 1.4 | 2.2 | 3.2 | 4.0 | 4.9 | 5.6 | 6.6 |
| Pressure ratio | | 3.32 | 3.52 | 3.51 | 3.51 | 3.50 | 3.49 | 3.48 | 3.48 |
| Volumetric efficiency | | 94.5% | 93.7% | 93.7% | 93.8% | 93.9% | 94.0% | 94.0% | 94.1% |
| Condenser glide | K | 0.2 | 8.6 | 8.2 | 7.9 | 7.5 | 7.3 | 6.8 | 6.5 |
| Evaporator glide | K | 0.1 | 8.1 | 7.8 | 7.5 | 7.2 | 6.9 | 6.6 | 6.3 |
| Evaporator inlet temperature | ° C. | 7.2 | 3.2 | 3.3 | 3.5 | 3.6 | 3.8 | 3.9 | 4.1 |
| Condenser exit temperature | ° C. | 46.0 | 41.8 | 42.0 | 42.2 | 42.4 | 42.5 | 42.7 | 42.9 |
| Condenser pressure | bar | 33.7 | 31.8 | 32.2 | 32.7 | 33.1 | 33.6 | 34.0 | 34.4 |
| Evaporator pressure | bar | 10.2 | 9.0 | 9.2 | 9.3 | 9.5 | 9.6 | 9.8 | 9.9 |
| Refrigeration effect | kJ/kg | 151.2 | 161.3 | 163.2 | 165.3 | 167.2 | 169.4 | 171.3 | 173.5 |
| Coefficient of Performance (COP) | | 2.88 | 2.97 | 2.97 | 2.96 | 2.96 | 2.95 | 2.95 | 2.94 |
| Discharge temperature | ° C. | 105.5 | 106.9 | 107.8 | 108.7 | 109.5 | 110.4 | 111.2 | 112.1 |
| Mass flow rate | kg/hr | 251 | 236 | 233 | 230 | 227 | 224 | 222 | 219 |
| Volumetric flow rate | m$^3$/hr | 7.28 | 7.67 | 7.55 | 7.43 | 7.33 | 7.22 | 7.14 | 7.04 |
| Volumetric cooling capacity | kJ/m$^3$ | 5226 | 4955 | 5033 | 5113 | 5185 | 5263 | 5326 | 5398 |
| Suction line pressure drop | Pa/m | 163 | 164 | 160 | 156 | 153 | 149 | 146 | 143 |
| Suction line gas density | kg/m$^3$ | 34.6 | 30.7 | 30.8 | 30.9 | 31.0 | 31.1 | 31.1 | 31.1 |
| Condenser line gas density | kg/m$^3$ | 155.3 | 149.4 | 150.2 | 151.2 | 151.6 | 152.2 | 152.2 | 152.5 |

Example 15 (Quaternary Blends of R-1132a/CO$_2$/R-32/R-1234yf Comprising 6 Weight % of R-1132a and 4 Weight % of CO$_2$ (R-744))

| | | Nominal composition (weight %) | | | | | | | |
|---|---|---|---|---|---|---|---|---|---|
| R-1132a | | | 6 | 6 | 6 | 6 | 6 | 6 | 6 |
| R-744 | | | 4 | 4 | 4 | 4 | 4 | 4 | 4 |
| R-32 | | | 36 | 38 | 40 | 42 | 44 | 46 | 48 |
| R-1234yf | | | 54 | 52 | 50 | 48 | 46 | 44 | 42 |
| Results | | R410A | | | | | | | |
| GWP (AR4 basis) | | 2107 | 244 | 257 | 271 | 284 | 298 | 311 | 325 |
| Cooling COP relative to reference | | 100.0% | 102.8% | 102.5% | 102.3% | 102.0% | 101.8% | 101.7% | 101.6% |
| Cooling Capacity relative to reference | | 100.0% | 96.1% | 97.5% | 98.9% | 100.3% | 101.7% | 103.1% | 104.5% |
| Compressor discharge temperature difference | K | 0.0 | 1.8 | 2.6 | 3.4 | 4.4 | 5.2 | 6.0 | 6.9 |
| Pressure ratio | | 3.32 | 3.52 | 3.51 | 3.50 | 3.49 | 3.49 | 3.48 | 3.47 |
| Volumetric efficiency | | 94.5% | 93.7% | 93.8% | 93.8% | 93.9% | 94.0% | 94.1% | 94.1% |
| Condenser glide | K | 0.2 | 8.7 | 8.2 | 7.8 | 7.3 | 7.0 | 6.7 | 6.5 |
| Evaporator glide | K | 0.1 | 8.3 | 8.0 | 7.7 | 7.4 | 7.0 | 6.7 | 6.5 |
| Evaporator inlet temperature | °C. | 7.2 | 3.1 | 3.2 | 3.4 | 3.5 | 3.7 | 3.8 | 4.0 |
| Condenser exit temperature | °C. | 46.0 | 41.7 | 42.0 | 42.2 | 42.5 | 42.6 | 42.8 | 42.8 |
| Condenser pressure | bar | 33.7 | 32.3 | 32.7 | 33.2 | 33.7 | 34.1 | 34.5 | 34.9 |
| Evaporator pressure | bar | 10.2 | 9.2 | 9.3 | 9.5 | 9.6 | 9.8 | 9.9 | 10.1 |
| Refrigeration effect | kJ/kg | 151.2 | 161.2 | 163.0 | 164.9 | 166.8 | 168.9 | 171.0 | 173.3 |
| Coefficient of Performance (COP) | | 2.88 | 2.96 | 2.95 | 2.95 | 2.94 | 2.93 | 2.93 | 2.93 |
| Discharge temperature | °C. | 105.5 | 107.3 | 108.2 | 109.0 | 109.9 | 110.7 | 111.6 | 112.5 |
| Mass flow rate | kg/hr | 251 | 236 | 233 | 231 | 228 | 225 | 222 | 219 |
| Volumetric flow rate | m$^3$/hr | 7.28 | 7.57 | 7.46 | 7.36 | 7.26 | 7.15 | 7.06 | 6.96 |
| Volumetric cooling capacity | kJ/m$^3$ | 5226 | 5022 | 5095 | 5168 | 5240 | 5313 | 5386 | 5461 |
| Suction line pressure drop | Pa/m | 163 | 162 | 159 | 155 | 152 | 148 | 145 | 141 |
| Suction line gas density | kg/m$^3$ | 34.6 | 31.1 | 31.3 | 31.3 | 31.4 | 31.5 | 31.5 | 31.5 |
| Condenser line gas density | kg/m$^3$ | 155.3 | 152.7 | 153.5 | 154.0 | 154.9 | 155.3 | 155.5 | 155.7 |

Example 16 (Quaternary Blends of R-1132a/CO$_2$/R-32/R-1234yf Comprising 7 Weight % of R-1132a and 4 Weight % of CO$_2$ (R-744))

| | | Nominal composition (weight %) | | | | | | | |
|---|---|---|---|---|---|---|---|---|---|
| R-1132a | | | 7 | 7 | 7 | 7 | 7 | 7 | 7 |
| R-744 | | | 4 | 4 | 4 | 4 | 4 | 4 | 4 |
| R-32 | | | 36 | 38 | 40 | 42 | 44 | 46 | 48 |
| R-1234yf | | | 53 | 51 | 49 | 47 | 45 | 43 | 41 |
| Results | | R410A | | | | | | | |
| GWP (AR4 basis) | | 2107 | 244 | 257 | 271 | 284 | 298 | 311 | 325 |
| Cooling COP relative to reference | | 100.0% | 102.3% | 102.0% | 101.8% | 101.7% | 101.4% | 101.3% | 101.2% |
| Cooling Capacity relative to reference | | 100.0% | 97.2% | 98.6% | 100.0% | 101.6% | 102.9% | 104.4% | 105.7% |
| Compressor discharge temperature difference | K | 0.0 | 2.1 | 3.0 | 3.8 | 4.7 | 5.6 | 6.4 | 7.3 |
| Pressure ratio | | 3.32 | 3.52 | 3.50 | 3.50 | 3.49 | 3.48 | 3.47 | 3.47 |
| Volumetric efficiency | | 94.5% | 93.7% | 93.8% | 93.9% | 93.9% | 94.0% | 94.1% | 94.2% |
| Condenser glide | K | 0.2 | 8.6 | 8.1 | 7.7 | 7.5 | 7.0 | 6.8 | 6.5 |
| Evaporator glide | K | 0.1 | 8.4 | 8.1 | 7.8 | 7.5 | 7.2 | 6.9 | 6.6 |
| Evaporator inlet temperature | °C. | 7.2 | 3.0 | 3.2 | 3.3 | 3.5 | 3.6 | 3.8 | 3.9 |
| Condenser exit temperature | °C. | 46.0 | 41.8 | 42.1 | 42.3 | 42.4 | 42.6 | 42.7 | 42.8 |
| Condenser pressure | bar | 33.7 | 32.8 | 33.2 | 33.7 | 34.2 | 34.6 | 35.0 | 35.4 |
| Evaporator pressure | bar | 10.2 | 9.3 | 9.5 | 9.6 | 9.8 | 9.9 | 10.1 | 10.2 |
| Refrigeration effect | kJ/kg | 151.2 | 160.9 | 162.7 | 164.6 | 166.8 | 168.6 | 170.9 | 173.0 |
| Coefficient of Performance (COP) | | 2.88 | 2.95 | 2.94 | 2.93 | 2.93 | 2.92 | 2.92 | 2.92 |
| Discharge temperature | °C. | 105.5 | 107.7 | 108.5 | 109.4 | 110.3 | 111.1 | 111.9 | 112.8 |
| Mass flow rate | kg/hr | 251 | 236 | 234 | 231 | 228 | 225 | 222 | 220 |
| Volumetric flow rate | m$^3$/hr | 7.28 | 7.49 | 7.38 | 7.27 | 7.16 | 7.07 | 6.97 | 6.88 |
| Volumetric cooling capacity | kJ/m$^3$ | 5226 | 5078 | 5152 | 5227 | 5309 | 5375 | 5453 | 5523 |
| Suction line pressure drop | Pa/m | 163 | 161 | 157 | 154 | 150 | 147 | 143 | 140 |
| Suction line gas density | kg/m$^3$ | 34.6 | 31.6 | 31.7 | 31.8 | 31.8 | 31.9 | 31.9 | 31.9 |
| Condenser line gas density | kg/m$^3$ | 155.3 | 155.9 | 156.7 | 157.5 | 158.2 | 158.7 | 158.9 | 159.1 |

Example 17 (Quaternary Blends of R-1132a/CO$_2$/R-32/R-1234yf Comprising 8 Weight % of R-1132a and 4 Weight % of CO$_2$ (R-744))

| Nominal composition (weight %) | | | | | | | | | |
|---|---|---|---|---|---|---|---|---|---|
| R-1132a | | | 8 | 8 | 8 | 8 | 8 | 8 | 8 |
| R-744 | | | 4 | 4 | 4 | 4 | 4 | 4 | 4 |
| R-32 | | | 36 | 38 | 40 | 42 | 44 | 46 | 48 |
| R-1234yf | | | 52 | 50 | 48 | 46 | 44 | 42 | 40 |
| Results | | R410A | | | | | | | |
| GWP (AR4 basis) | | 2107 | 244 | 257 | 271 | 284 | 298 | 311 | 325 |
| Cooling COP relative to reference | | 100.0% | 101.8% | 101.6% | 101.4% | 101.3% | 101.1% | 100.9% | 100.7% |
| Cooling Capacity relative to reference | | 100.0% | 98.3% | 99.8% | 101.3% | 102.8% | 104.2% | 105.5% | 106.7% |
| Compressor discharge temperature difference | K | 0.0 | 2.5 | 3.4 | 4.2 | 5.0 | 5.9 | 6.7 | 7.6 |
| Pressure ratio | | 3.32 | 3.51 | 3.50 | 3.49 | 3.48 | 3.48 | 3.47 | 3.46 |
| Volumetric efficiency | | 94.5% | 93.7% | 93.8% | 93.9% | 94.0% | 94.0% | 94.1% | 94.2% |
| Condenser glide | K | 0.2 | 8.6 | 8.2 | 7.8 | 7.5 | 7.1 | 6.8 | 6.3 |
| Evaporator glide | K | 0.1 | 8.6 | 8.3 | 7.9 | 7.6 | 7.3 | 7.0 | 6.7 |
| Evaporator inlet temperature | ° C. | 7.2 | 2.9 | 3.1 | 3.3 | 3.4 | 3.6 | 3.7 | 3.9 |
| Condenser exit temperature | ° C. | 46.0 | 41.8 | 42.0 | 42.2 | 42.4 | 42.6 | 42.7 | 42.9 |
| Condenser pressure | bar | 33.7 | 33.3 | 33.8 | 34.3 | 34.7 | 35.1 | 35.5 | 35.9 |
| Evaporator pressure | bar | 10.2 | 9.5 | 9.7 | 9.8 | 10.0 | 10.1 | 10.2 | 10.4 |
| Refrigeration effect | kJ/kg | 151.2 | 160.6 | 162.5 | 164.5 | 166.6 | 168.5 | 170.6 | 172.5 |
| Coefficient of Performance (COP) | | 2.88 | 2.93 | 2.93 | 2.92 | 2.92 | 2.91 | 2.91 | 2.90 |
| Discharge temperature | ° C. | 105.5 | 108.1 | 108.9 | 109.8 | 110.6 | 111.4 | 112.3 | 113.1 |
| Mass flow rate | kg/hr | 251 | 237 | 234 | 231 | 228 | 226 | 223 | 220 |
| Volumetric flow rate | m$^3$/hr | 7.28 | 7.40 | 7.29 | 7.18 | 7.08 | 6.98 | 6.89 | 6.82 |
| Volumetric cooling capacity | kJ/m$^3$ | 5226 | 5139 | 5218 | 5295 | 5372 | 5443 | 5515 | 5578 |
| Suction line pressure drop | Pa/m | 163 | 159 | 155 | 152 | 148 | 145 | 142 | 139 |
| Suction line gas density | kg/m$^3$ | 34.6 | 32.0 | 32.1 | 32.2 | 32.3 | 32.3 | 32.3 | 32.3 |
| Condenser line gas density | kg/m$^3$ | 155.3 | 159.3 | 160.3 | 161.1 | 161.6 | 162.2 | 162.4 | 162.5 |

Example 18 (Quaternary Blends of R-1132a/CO$_2$/R-32/R-1234yf Comprising 9 Weight % of R-1132a and 4 Weight % of CO$_2$ (R-744))

| Nominal composition (weight %) | | | | | | | | | |
|---|---|---|---|---|---|---|---|---|---|
| R-1132a | | | 9 | 9 | 9 | 9 | 9 | 9 | 9 |
| R-744 | | | 4 | 4 | 4 | 4 | 4 | 4 | 4 |
| R-32 | | | 36 | 38 | 40 | 42 | 44 | 46 | 48 |
| R-1234yf | | | 51 | 49 | 47 | 45 | 43 | 41 | 39 |
| Results | | R410A | | | | | | | |
| GWP (AR4 basis) | | 2107 | 244 | 257 | 271 | 284 | 298 | 311 | 325 |
| Cooling COP relative to reference | | 100.0% | 101.3% | 101.2% | 101.0% | 100.8% | 100.6% | 100.5% | 100.3% |
| Cooling Capacity relative to reference | | 100.0% | 99.4% | 101.1% | 102.5% | 103.9% | 105.3% | 106.6% | 107.9% |
| Compressor discharge temperature difference | K | 0.0 | 2.8 | 3.7 | 4.6 | 5.3 | 6.2 | 7.0 | 7.9 |
| Pressure ratio | | 3.32 | 3.50 | 3.49 | 3.49 | 3.47 | 3.47 | 3.46 | 3.45 |
| Volumetric efficiency | | 94.5% | 93.8% | 93.8% | 93.9% | 94.0% | 94.1% | 94.1% | 94.2% |
| Condenser glide | K | 0.2 | 8.5 | 8.2 | 7.7 | 7.3 | 7.1 | 6.7 | 6.3 |
| Evaporator glide | K | 0.1 | 8.7 | 8.4 | 8.1 | 7.7 | 7.4 | 7.1 | 6.8 |
| Evaporator inlet temperature | ° C. | 7.2 | 2.9 | 3.0 | 3.2 | 3.4 | 3.5 | 3.7 | 3.8 |
| Condenser exit temperature | ° C. | 46.0 | 41.9 | 42.0 | 42.2 | 42.4 | 42.6 | 42.8 | 43.0 |
| Condenser pressure | bar | 33.7 | 33.8 | 34.3 | 34.8 | 35.2 | 35.6 | 36.0 | 36.4 |
| Evaporator pressure | bar | 10.2 | 9.7 | 9.8 | 10.0 | 10.1 | 10.3 | 10.4 | 10.6 |
| Refrigeration effect | kJ/kg | 151.2 | 160.2 | 162.3 | 164.2 | 166.1 | 168.2 | 170.2 | 172.2 |
| Coefficient of Performance (COP) | | 2.88 | 2.92 | 2.92 | 2.91 | 2.91 | 2.90 | 2.90 | 2.89 |
| Discharge temperature | ° C. | 105.5 | 108.4 | 109.2 | 110.1 | 110.9 | 111.8 | 112.5 | 113.4 |
| Mass flow rate | kg/hr | 251 | 237 | 234 | 232 | 229 | 226 | 223 | 221 |
| Volumetric flow rate | m$^3$/hr | 7.28 | 7.32 | 7.20 | 7.10 | 7.01 | 6.91 | 6.82 | 6.74 |
| Volumetric cooling capacity | kJ/m$^3$ | 5226 | 5195 | 5281 | 5355 | 5427 | 5504 | 5573 | 5639 |
| Suction line pressure drop | Pa/m | 163 | 158 | 154 | 150 | 147 | 143 | 140 | 138 |
| Suction line gas density | kg/m$^3$ | 34.6 | 32.4 | 32.5 | 32.6 | 32.7 | 32.7 | 32.7 | 32.7 |
| Condenser line gas density | kg/m$^3$ | 155.3 | 162.6 | 163.7 | 164.7 | 165.0 | 165.8 | 165.8 | 166.0 |

Example 19 (Quaternary Blends of R-1132a/CO$_2$/R-32/R-1234yf Comprising 10 Weight % of R-1132a and 4 Weight % of CO$_2$ (R-744))

| Nominal composition (weight %) | | | | | | | | | |
|---|---|---|---|---|---|---|---|---|---|
| R-1132a | | | 10 | 10 | 10 | 10 | 10 | 10 | 10 |
| R-744 | | | 4 | 4 | 4 | 4 | 4 | 4 | 4 |
| R-32 | | | 36 | 38 | 40 | 42 | 44 | 46 | 48 |
| R-1234yf | | | 50 | 48 | 46 | 44 | 42 | 40 | 38 |
| Results | | R410A | | | | | | | |
| GWP (AR4 basis) | | 2107 | 244 | 257 | 271 | 284 | 298 | 311 | 325 |
| Cooling COP relative to reference | | 100.0% | 100.8% | 100.7% | 100.6% | 100.3% | 100.2% | 100.1% | 100.0% |
| Cooling Capacity relative to reference | | 100.0% | 100.6% | 102.1% | 103.7% | 105.1% | 106.4% | 107.9% | 109.2% |
| Compressor discharge temperature difference | K | 0.0 | 3.3 | 4.1 | 4.9 | 5.7 | 6.5 | 7.4 | 8.2 |
| Pressure ratio | | 3.32 | 3.50 | 3.49 | 3.48 | 3.47 | 3.46 | 3.46 | 3.45 |
| Volumetric efficiency | | 94.5% | 93.8% | 93.9% | 93.9% | 94.0% | 94.1% | 94.2% | 94.2% |
| Condenser glide | K | 0.2 | 8.5 | 8.1 | 7.8 | 7.3 | 6.9 | 6.7 | 6.4 |
| Evaporator glide | K | 0.1 | 8.8 | 8.5 | 8.2 | 7.8 | 7.5 | 7.2 | 6.9 |
| Evaporator inlet temperature | °C. | 7.2 | 2.8 | 3.0 | 3.1 | 3.3 | 3.5 | 3.6 | 3.8 |
| Condenser exit temperature | °C. | 46.0 | 41.9 | 42.1 | 42.2 | 42.4 | 42.6 | 42.8 | 42.9 |
| Condenser pressure | bar | 33.7 | 34.4 | 34.8 | 35.3 | 35.7 | 36.1 | 36.6 | 37.0 |
| Evaporator pressure | bar | 10.2 | 9.8 | 10.0 | 10.1 | 10.3 | 10.4 | 10.6 | 10.7 |
| Refrigeration effect | kJ/kg | 151.2 | 160.0 | 161.9 | 163.9 | 165.8 | 167.8 | 169.9 | 172.1 |
| Coefficient of Performance (COP) | | 2.88 | 2.91 | 2.90 | 2.90 | 2.89 | 2.89 | 2.88 | 2.88 |
| Discharge temperature | °C. | 105.5 | 108.8 | 109.6 | 110.4 | 111.3 | 112.0 | 112.9 | 113.7 |
| Mass flow rate | kg/hr | 251 | 238 | 235 | 232 | 229 | 227 | 224 | 221 |
| Volumetric flow rate | m$^3$/hr | 7.28 | 7.23 | 7.12 | 7.02 | 6.92 | 6.84 | 6.74 | 6.66 |
| Volumetric cooling capacity | kJ/m$^3$ | 5226 | 5258 | 5338 | 5418 | 5490 | 5561 | 5637 | 5707 |
| Suction line pressure drop | Pa/m | 163 | 156 | 152 | 149 | 145 | 142 | 139 | 136 |
| Suction line gas density | kg/m$^3$ | 34.6 | 32.9 | 33.0 | 33.1 | 33.1 | 33.1 | 33.2 | 33.2 |
| Condenser line gas density | kg/m$^3$ | 155.3 | 166.6 | 167.7 | 168.3 | 169.1 | 169.3 | 169.8 | 169.9 |

Example 20 (Quaternary Blends of R-1132a/CO$_2$/R-32/R-1234yf Comprising 4 Weight % of R-1132a and 5 Weight % of CO$_2$ (R-744))

| Nominal composition (weight %) | | | | | | | | | |
|---|---|---|---|---|---|---|---|---|---|
| R-1132a | | | 4 | 4 | 4 | 4 | 4 | 4 | 4 |
| R-744 | | | 5 | 5 | 5 | 5 | 5 | 5 | 5 |
| R-32 | | | 36 | 38 | 40 | 42 | 44 | 46 | 48 |
| R-1234yf | | | 55 | 53 | 51 | 49 | 47 | 45 | 43 |
| Results | | R410A | | | | | | | |
| GWP (AR4 basis) | | 2107 | 244 | 257 | 271 | 284 | 298 | 311 | 325 |
| Cooling COP relative to reference | | 100.0% | 103.0% | 102.7% | 102.5% | 102.3% | 102.1% | 101.9% | 101.7% |
| Cooling Capacity relative to reference | | 100.0% | 96.0% | 97.5% | 98.9% | 100.3% | 101.7% | 103.1% | 104.4% |
| Compressor discharge temperature difference | K | 0.0 | 2.2 | 3.0 | 3.9 | 4.8 | 5.6 | 6.5 | 7.4 |
| Pressure ratio | | 3.32 | 3.54 | 3.53 | 3.52 | 3.51 | 3.50 | 3.49 | 3.49 |
| Volumetric efficiency | | 94.5% | 93.7% | 93.7% | 93.8% | 93.9% | 94.0% | 94.0% | 94.1% |
| Condenser glide | K | 0.2 | 9.1 | 8.7 | 8.3 | 7.9 | 7.5 | 7.3 | 6.9 |
| Evaporator glide | K | 0.1 | 8.4 | 8.1 | 7.8 | 7.5 | 7.2 | 6.9 | 6.6 |
| Evaporator inlet temperature | °C. | 7.2 | 3.0 | 3.2 | 3.3 | 3.5 | 3.6 | 3.8 | 3.9 |
| Condenser exit temperature | °C. | 46.0 | 41.6 | 41.8 | 42.0 | 42.1 | 42.4 | 42.5 | 42.6 |
| Condenser pressure | bar | 33.7 | 32.2 | 32.7 | 33.1 | 33.6 | 34.0 | 34.4 | 34.8 |
| Evaporator pressure | bar | 10.2 | 9.1 | 9.3 | 9.4 | 9.6 | 9.7 | 9.9 | 10.0 |
| Refrigeration effect | kJ/kg | 151.2 | 162.4 | 164.3 | 166.3 | 168.3 | 170.3 | 172.5 | 174.6 |
| Coefficient of Performance (COP) | | 2.88 | 2.97 | 2.96 | 2.95 | 2.95 | 2.94 | 2.94 | 2.93 |
| Discharge temperature | °C. | 105.5 | 107.7 | 108.6 | 109.4 | 110.3 | 111.1 | 112.1 | 112.9 |
| Mass flow rate | kg/hr | 251 | 234 | 231 | 229 | 226 | 223 | 220 | 218 |
| Volumetric flow rate | m$^3$/hr | 7.28 | 7.58 | 7.46 | 7.35 | 7.25 | 7.16 | 7.06 | 6.97 |
| Volumetric cooling capacity | kJ/m$^3$ | 5226 | 5016 | 5093 | 5169 | 5244 | 5313 | 5387 | 5455 |
| Suction line pressure drop | Pa/m | 163 | 162 | 158 | 154 | 150 | 147 | 144 | 141 |
| Suction line gas density | kg/m$^3$ | 34.6 | 30.9 | 31.0 | 31.1 | 31.2 | 31.2 | 31.2 | 31.3 |
| Condenser line gas density | kg/m$^3$ | 155.3 | 151.0 | 151.9 | 152.6 | 153.3 | 153.5 | 154.0 | 154.2 |

Example 21 (Quaternary Blends of R-1132a/CO$_2$/R-32/R-1234yf Comprising 5 Weight % of R-1132a and 5 Weight % of CO$_2$ (R-744))

| Nominal composition (weight %) | | | | | | | | |
|---|---|---|---|---|---|---|---|---|
| R-1132a | | 5 | 5 | 5 | 5 | 5 | 5 | 5 |
| R-744 | | 5 | 5 | 5 | 5 | 5 | 5 | 5 |
| R-32 | | 36 | 38 | 40 | 42 | 44 | 46 | 48 |
| R-1234yf | | 54 | 52 | 50 | 48 | 46 | 44 | 42 |
| Results | | R410A | | | | | | |
| GWP (AR4 basis) | | 2107 | 244 | 257 | 271 | 284 | 298 | 311 | 325 |
| Cooling COP relative to reference | | 100.0% | 102.5% | 102.3% | 102.1% | 101.9% | 101.7% | 101.5% | 101.3% |
| Cooling Capacity relative to reference | | 100.0% | 97.2% | 98.6% | 100.1% | 101.6% | 102.9% | 104.3% | 105.6% |
| Compressor discharge temperature difference | K | 0.0 | 2.5 | 3.4 | 4.3 | 5.1 | 6.0 | 6.9 | 7.7 |
| Pressure ratio | | 3.32 | 3.53 | 3.52 | 3.51 | 3.50 | 3.49 | 3.49 | 3.48 |
| Volumetric efficiency | | 94.5% | 93.7% | 93.8% | 93.8% | 93.9% | 94.0% | 94.1% | 94.1% |
| Condenser glide | K | 0.2 | 9.1 | 8.6 | 8.3 | 8.0 | 7.5 | 7.3 | 6.9 |
| Evaporator glide | K | 0.1 | 8.6 | 8.2 | 7.9 | 7.6 | 7.3 | 7.0 | 6.7 |
| Evaporator inlet temperature | °C. | 7.2 | 2.9 | 3.1 | 3.3 | 3.4 | 3.6 | 3.7 | 3.9 |
| Condenser exit temperature | °C. | 46.0 | 41.6 | 41.8 | 42.0 | 42.1 | 42.4 | 42.5 | 42.6 |
| Condenser pressure | bar | 33.7 | 32.7 | 33.2 | 33.7 | 34.1 | 34.5 | 34.9 | 35.3 |
| Evaporator pressure | bar | 10.2 | 9.3 | 9.4 | 9.6 | 9.7 | 9.9 | 10.0 | 10.2 |
| Refrigeration effect | kJ/kg | 151.2 | 162.2 | 164.0 | 166.1 | 168.1 | 170.0 | 172.2 | 174.3 |
| Coefficient of Performance (COP) | | 2.88 | 2.95 | 2.95 | 2.94 | 2.94 | 2.93 | 2.92 | 2.92 |
| Discharge temperature | °C. | 105.5 | 108.1 | 108.9 | 109.8 | 110.7 | 111.5 | 112.4 | 113.3 |
| Mass flow rate | kg/hr | 251 | 234 | 232 | 229 | 226 | 224 | 221 | 218 |
| Volumetric flow rate | m$^3$/hr | 7.28 | 7.49 | 7.38 | 7.27 | 7.16 | 7.07 | 6.98 | 6.89 |
| Volumetric cooling capacity | kJ/m$^3$ | 5226 | 5077 | 5153 | 5231 | 5307 | 5375 | 5449 | 5519 |
| Suction line pressure drop | Pa/m | 163 | 160 | 156 | 152 | 149 | 146 | 142 | 139 |
| Suction line gas density | kg/m$^3$ | 34.6 | 31.3 | 31.4 | 31.5 | 31.6 | 31.6 | 31.6 | 31.7 |
| Condenser line gas density | kg/m$^3$ | 155.3 | 154.2 | 155.0 | 155.9 | 156.5 | 156.8 | 157.3 | 157.4 |

Example 22 (Quaternary Blends of R-1132a/CO$_2$/R-32/R-1234yf Comprising 6 Weight % of R-1132a and 5 Weight % of CO$_2$ (R-744))

| Nominal composition (weight %) | | | | | | | | |
|---|---|---|---|---|---|---|---|---|
| R-1132a | | 6 | 6 | 6 | 6 | 6 | 6 | 6 |
| R-744 | | 5 | 5 | 5 | 5 | 5 | 5 | 5 |
| R-32 | | 36 | 38 | 40 | 42 | 44 | 46 | 48 |
| R-1234yf | | 53 | 51 | 49 | 47 | 45 | 43 | 41 |
| Results | | R410A | | | | | | |
| GWP (AR4 basis) | | 2107 | 244 | 257 | 271 | 284 | 298 | 311 | 325 |
| Cooling COP relative to reference | | 100.0% | 102.0% | 101.7% | 101.5% | 101.5% | 101.2% | 100.9% | 101.0% |
| Cooling Capacity relative to reference | | 100.0% | 98.3% | 99.7% | 101.2% | 102.8% | 104.0% | 105.3% | 106.8% |
| Compressor discharge temperature difference | K | 0.0 | 2.9 | 3.8 | 4.7 | 5.5 | 6.3 | 7.2 | 8.1 |
| Pressure ratio | | 3.32 | 3.53 | 3.52 | 3.51 | 3.50 | 3.49 | 3.48 | 3.48 |
| Volumetric efficiency | | 94.5% | 93.7% | 93.8% | 93.9% | 93.9% | 94.0% | 94.1% | 94.2% |
| Condenser glide | K | 0.2 | 9.1 | 8.5 | 8.1 | 8.1 | 7.5 | 7.1 | 7.0 |
| Evaporator glide | K | 0.1 | 8.7 | 8.4 | 8.1 | 7.8 | 7.4 | 7.1 | 6.8 |
| Evaporator inlet temperature | °C. | 7.2 | 2.9 | 3.0 | 3.2 | 3.3 | 3.5 | 3.7 | 3.8 |
| Condenser exit temperature | °C. | 46.0 | 41.6 | 41.9 | 42.1 | 42.1 | 42.4 | 42.6 | 42.6 |
| Condenser pressure | bar | 33.7 | 33.2 | 33.7 | 34.2 | 34.6 | 35.0 | 35.5 | 35.9 |
| Evaporator pressure | bar | 10.2 | 9.4 | 9.6 | 9.7 | 9.9 | 10.0 | 10.2 | 10.3 |
| Refrigeration effect | kJ/kg | 151.2 | 161.9 | 163.7 | 165.6 | 168.0 | 169.8 | 171.7 | 174.1 |
| Coefficient of Performance (COP) | | 2.88 | 2.94 | 2.93 | 2.93 | 2.93 | 2.92 | 2.91 | 2.91 |
| Discharge temperature | °C. | 105.5 | 108.5 | 109.3 | 110.2 | 111.0 | 111.8 | 112.8 | 113.6 |
| Mass flow rate | kg/hr | 251 | 235 | 232 | 230 | 226 | 224 | 221 | 218 |
| Volumetric flow rate | m$^3$/hr | 7.28 | 7.40 | 7.30 | 7.19 | 7.07 | 6.99 | 6.91 | 6.81 |
| Volumetric cooling capacity | kJ/m$^3$ | 5226 | 5138 | 5210 | 5286 | 5374 | 5437 | 5504 | 5582 |
| Suction line pressure drop | Pa/m | 163 | 158 | 155 | 151 | 147 | 144 | 141 | 138 |
| Suction line gas density | kg/m$^3$ | 34.6 | 31.7 | 31.8 | 31.9 | 32.0 | 32.0 | 32.0 | 32.1 |
| Condenser line gas density | kg/m$^3$ | 155.3 | 157.6 | 158.5 | 159.3 | 159.9 | 160.1 | 160.7 | 160.7 |

Example 23 (Quaternary Blends of R-1132a/$CO_2$/R-32/R-1234yf Comprising 7 Weight % of R-1132a and 5 Weight % of $CO_2$ (R-744))

| Nominal composition (weight %) | | | | | | | | | |
|---|---|---|---|---|---|---|---|---|---|
| R-1132a | | | 7 | 7 | 7 | 7 | 7 | 7 | 7 |
| R-744 | | | 5 | 5 | 5 | 5 | 5 | 5 | 5 |
| R-32 | | | 36 | 38 | 40 | 42 | 44 | 46 | 48 |
| R-1234yf | | | 52 | 50 | 48 | 46 | 44 | 42 | 40 |

| Results | | R410A | | | | | | | |
|---|---|---|---|---|---|---|---|---|---|
| GWP (AR4 basis) | | 2107 | 244 | 257 | 271 | 284 | 298 | 311 | 325 |
| Cooling COP relative to reference | | 100.0% | 101.6% | 101.3% | 101.1% | 101.0% | 100.8% | 100.7% | 100.6% |
| Cooling Capacity relative to reference | | 100.0% | 99.5% | 101.0% | 102.5% | 103.9% | 105.2% | 106.6% | 108.0% |
| Compressor discharge temperature difference | K | 0.0 | 3.3 | 4.2 | 5.0 | 5.9 | 6.6 | 7.5 | 8.4 |
| Pressure ratio | | 3.32 | 3.52 | 3.51 | 3.50 | 3.49 | 3.48 | 3.48 | 3.47 |
| Volumetric efficiency | | 94.5% | 93.7% | 93.8% | 93.9% | 94.0% | 94.0% | 94.1% | 94.2% |
| Condenser glide | K | 0.2 | 9.0 | 8.6 | 8.2 | 7.9 | 7.4 | 7.1 | 7.0 |
| Evaporator glide | K | 0.1 | 8.8 | 8.5 | 8.2 | 7.9 | 7.5 | 7.2 | 6.9 |
| Evaporator inlet temperature | °C. | 7.2 | 2.8 | 3.0 | 3.1 | 3.3 | 3.5 | 3.6 | 3.8 |
| Condenser exit temperature | °C. | 46.0 | 41.6 | 41.8 | 42.0 | 42.2 | 42.4 | 42.6 | 42.6 |
| Condenser pressure | bar | 33.7 | 33.8 | 34.2 | 34.7 | 35.2 | 35.5 | 36.0 | 36.4 |
| Evaporator pressure | bar | 10.2 | 9.6 | 9.8 | 9.9 | 10.1 | 10.2 | 10.3 | 10.5 |
| Refrigeration effect | kJ/kg | 151.2 | 161.6 | 163.6 | 165.5 | 167.5 | 169.5 | 171.5 | 173.8 |
| Coefficient of Performance (COP) | | 2.88 | 2.93 | 2.92 | 2.92 | 2.91 | 2.91 | 2.90 | 2.90 |
| Discharge temperature | °C. | 105.5 | 108.8 | 109.7 | 110.6 | 111.4 | 112.2 | 113.0 | 113.9 |
| Mass flow rate | kg/hr | 251 | 235 | 232 | 230 | 227 | 224 | 222 | 219 |
| Volumetric flow rate | m³/hr | 7.28 | 7.31 | 7.20 | 7.10 | 7.00 | 6.91 | 6.83 | 6.73 |
| Volumetric cooling capacity | kJ/m³ | 5226 | 5199 | 5277 | 5354 | 5429 | 5498 | 5569 | 5645 |
| Suction line pressure drop | Pa/m | 163 | 157 | 153 | 149 | 146 | 143 | 140 | 136 |
| Suction line gas density | kg/m³ | 34.6 | 32.2 | 32.3 | 32.3 | 32.4 | 32.4 | 32.5 | 32.5 |
| Condenser line gas density | kg/m³ | 155.3 | 161.0 | 162.0 | 162.8 | 163.5 | 163.6 | 163.9 | 164.1 |

Example 24 (Quaternary Blends of R-1132a/$CO_2$/R-32/R-1234yf Comprising 8 Weight % of R-1132a and 5 Weight % of $CO_2$ (R-744))

| Nominal composition (weight %) | | | | | | | | | |
|---|---|---|---|---|---|---|---|---|---|
| R-1132a | | | 8 | 8 | 8 | 8 | 8 | 8 | 8 |
| R-744 | | | 5 | 5 | 5 | 5 | 5 | 5 | 5 |
| R-32 | | | 36 | 38 | 40 | 42 | 44 | 46 | 48 |
| R-1234yf | | | 51 | 49 | 47 | 45 | 43 | 41 | 39 |

| Results | | R410A | | | | | | | |
|---|---|---|---|---|---|---|---|---|---|
| GWP (AR4 basis) | | 2107 | 244 | 257 | 271 | 284 | 298 | 311 | 325 |
| Cooling COP relative to reference | | 100.0% | 101.1% | 100.9% | 100.8% | 100.6% | 100.5% | 100.2% | 100.1% |
| Cooling Capacity relative to reference | | 100.0% | 100.6% | 102.1% | 103.8% | 105.1% | 106.5% | 107.8% | 109.1% |
| Compressor discharge temperature difference | K | 0.0 | 3.7 | 4.5 | 5.3 | 6.2 | 7.0 | 7.9 | 8.7 |
| Pressure ratio | | 3.32 | 3.51 | 3.50 | 3.50 | 3.49 | 3.48 | 3.47 | 3.46 |
| Volumetric efficiency | | 94.5% | 93.8% | 93.8% | 93.9% | 94.0% | 94.1% | 94.1% | 94.2% |
| Condenser glide | K | 0.2 | 9.0 | 8.5 | 8.4 | 7.9 | 7.6 | 7.1 | 6.8 |
| Evaporator glide | K | 0.1 | 9.0 | 8.6 | 8.3 | 8.0 | 7.6 | 7.3 | 7.0 |
| Evaporator inlet temperature | °C. | 7.2 | 2.7 | 2.9 | 3.1 | 3.2 | 3.4 | 3.6 | 3.7 |
| Condenser exit temperature | °C. | 46.0 | 41.6 | 41.9 | 41.9 | 42.2 | 42.3 | 42.5 | 42.7 |
| Condenser pressure | bar | 33.7 | 34.3 | 34.7 | 35.2 | 35.7 | 36.1 | 36.5 | 36.9 |
| Evaporator pressure | bar | 10.2 | 9.8 | 9.9 | 10.1 | 10.2 | 10.4 | 10.5 | 10.6 |
| Refrigeration effect | kJ/kg | 151.2 | 161.3 | 163.2 | 165.4 | 167.3 | 169.3 | 171.3 | 173.4 |
| Coefficient of Performance (COP) | | 2.88 | 2.91 | 2.91 | 2.91 | 2.90 | 2.90 | 2.89 | 2.88 |
| Discharge temperature | °C. | 105.5 | 109.2 | 110.0 | 110.9 | 111.7 | 112.5 | 113.4 | 114.2 |
| Mass flow rate | kg/hr | 251 | 236 | 233 | 230 | 227 | 225 | 222 | 219 |
| Volumetric flow rate | m³/hr | 7.28 | 7.23 | 7.13 | 7.01 | 6.92 | 6.83 | 6.75 | 6.67 |
| Volumetric cooling capacity | kJ/m³ | 5226 | 5259 | 5334 | 5422 | 5491 | 5566 | 5634 | 5703 |
| Suction line pressure drop | Pa/m | 163 | 155 | 151 | 147 | 144 | 141 | 138 | 135 |
| Suction line gas density | kg/m³ | 34.6 | 32.6 | 32.7 | 32.8 | 32.8 | 32.9 | 32.9 | 32.9 |
| Condenser line gas density | kg/m³ | 155.3 | 164.6 | 165.4 | 166.5 | 167.0 | 167.4 | 167.9 | 167.9 |

Example 25 (Quaternary Blends of R-1132a/CO$_2$/R-32/R-1234yf Comprising 9 Weight % of R-1132a and 5 Weight % of CO$_2$ (R-744))

| | | \multicolumn{8}{c}{Nominal composition (weight %)} | | | | | | | |
|---|---|---|---|---|---|---|---|---|---|
| | | | \multicolumn{7}{c}{R-1132a} | | | | | | |
| | | | 9 | 9 | 9 | 9 | 9 | 9 | 9 |
| | | | \multicolumn{7}{c}{R-744} | | | | | | |
| | | | 5 | 5 | 5 | 5 | 5 | 5 | 5 |
| | | | \multicolumn{7}{c}{R-32} | | | | | | |
| | | | 36 | 38 | 40 | 42 | 44 | 46 | 48 |
| | | | \multicolumn{7}{c}{R-1234yf} | | | | | | |
| Results | | R410A | 50 | 48 | 46 | 44 | 42 | 40 | 38 |
| GWP (AR4 basis) | | 2107 | 244 | 257 | 271 | 284 | 298 | 311 | 325 |
| Cooling COP relative to reference | | 100.0% | 100.7% | 100.5% | 100.3% | 100.2% | 99.8% | 99.8% | 99.6% |
| Cooling Capacity relative to reference | | 100.0% | 101.8% | 103.4% | 104.8% | 106.3% | 107.5% | 109.0% | 110.2% |
| Compressor discharge temperature difference | K | 0.0 | 4.0 | 4.9 | 5.6 | 6.4 | 7.3 | 8.2 | 9.0 |
| Pressure ratio | | 3.32 | 3.51 | 3.50 | 3.49 | 3.48 | 3.47 | 3.47 | 3.46 |
| Volumetric efficiency | | 94.5% | 93.8% | 93.9% | 93.9% | 94.0% | 94.1% | 94.2% | 94.2% |
| Condenser glide | K | 0.2 | 9.0 | 8.7 | 8.2 | 7.8 | 7.2 | 7.1 | 6.6 |
| Evaporator glide | K | 0.1 | 9.1 | 8.7 | 8.4 | 8.1 | 7.7 | 7.4 | 7.1 |
| Evaporator inlet temperature | ° C. | 7.2 | 2.7 | 2.8 | 3.0 | 3.2 | 3.4 | 3.5 | 3.7 |
| Condenser exit temperature | ° C. | 46.0 | 41.6 | 41.8 | 42.0 | 42.2 | 42.5 | 42.6 | 42.8 |
| Condenser pressure | bar | 33.7 | 34.8 | 35.3 | 35.7 | 36.2 | 36.6 | 37.0 | 37.4 |
| Evaporator pressure | bar | 10.2 | 9.9 | 10.1 | 10.2 | 10.4 | 10.5 | 10.7 | 10.8 |
| Refrigeration effect | kJ/kg | 151.2 | 161.1 | 163.1 | 164.9 | 167.0 | 168.7 | 170.9 | 172.9 |
| Coefficient of Performance (COP) | | 2.88 | 2.90 | 2.90 | 2.89 | 2.89 | 2.88 | 2.88 | 2.87 |
| Discharge temperature | ° C. | 105.5 | 109.5 | 110.4 | 111.2 | 112.0 | 112.9 | 113.7 | 114.5 |
| Mass flow rate | kg/hr | 251 | 236 | 233 | 230 | 228 | 225 | 222 | 220 |
| Volumetric flow rate | m$^3$/hr | 7.28 | 7.14 | 7.03 | 6.94 | 6.85 | 6.77 | 6.68 | 6.60 |
| Volumetric cooling capacity | kJ/m$^3$ | 5226 | 5322 | 5404 | 5477 | 5554 | 5615 | 5694 | 5758 |
| Suction line pressure drop | Pa/m | 163 | 153 | 150 | 146 | 143 | 140 | 137 | 134 |
| Suction line gas density | kg/m$^3$ | 34.6 | 33.0 | 33.1 | 33.2 | 33.3 | 33.3 | 33.3 | 33.3 |
| Condenser line gas density | kg/m$^3$ | 155.3 | 168.2 | 169.4 | 170.2 | 170.7 | 171.4 | 171.7 | 171.5 |

Example 26 (Quaternary Blends of R-1132a/CO$_2$/R-32/R-1234yf Comprising 10 Weight % of R-1132a and 5 Weight % of CO$_2$ (R-744))

| | | \multicolumn{8}{c}{Nominal composition (weight %)} | | | | | | | |
|---|---|---|---|---|---|---|---|---|---|
| | | | \multicolumn{7}{c}{R-1132a} | | | | | | |
| | | | 10 | 10 | 10 | 10 | 10 | 10 | 10 |
| | | | \multicolumn{7}{c}{R-744} | | | | | | |
| | | | 5 | 5 | 5 | 5 | 5 | 5 | 5 |
| | | | \multicolumn{7}{c}{R-32} | | | | | | |
| | | | 36 | 38 | 40 | 42 | 44 | 46 | 48 |
| | | | \multicolumn{7}{c}{R-1234yf} | | | | | | |
| | | R410A | 49 | 47 | 45 | 43 | 41 | 39 | 37 |
| GWP (AR4 basis) | | 2107 | 244 | 257 | 271 | 284 | 298 | 311 | 325 |
| Cooling COP relative to reference | | 100.0% | 100.1% | 99.9% | 99.8% | 99.6% | 99.5% | 99.4% | 99.3% |
| Cooling Capacity relative to reference | | 100.0% | 102.9% | 104.3% | 105.9% | 107.3% | 108.7% | 110.1% | 111.4% |
| Compressor discharge temperature difference | K | 0.0 | 4.4 | 5.1 | 6.0 | 6.8 | 7.6 | 8.4 | 9.3 |
| Pressure ratio | | 3.32 | 3.50 | 3.49 | 3.49 | 3.47 | 3.47 | 3.46 | 3.45 |
| Volumetric efficiency | | 94.5% | 93.8% | 93.9% | 94.0% | 94.0% | 94.1% | 94.2% | 94.3% |
| Condenser glide | K | 0.2 | 8.8 | 8.3 | 8.0 | 7.6 | 7.3 | 7.0 | 6.7 |
| Evaporator glide | K | 0.1 | 9.2 | 8.8 | 8.5 | 8.1 | 7.8 | 7.5 | 7.2 |
| Evaporator inlet temperature | ° C. | 7.2 | 2.6 | 2.8 | 3.0 | 3.1 | 3.3 | 3.5 | 3.6 |
| Condenser exit temperature | ° C. | 46.0 | 41.7 | 42.0 | 42.1 | 42.3 | 42.5 | 42.6 | 42.8 |
| Condenser pressure | bar | 33.7 | 35.4 | 35.8 | 36.3 | 36.7 | 37.1 | 37.5 | 37.9 |
| Evaporator pressure | bar | 10.2 | 10.1 | 10.3 | 10.4 | 10.6 | 10.7 | 10.9 | 11.0 |
| Refrigeration effect | kJ/kg | 151.2 | 160.6 | 162.5 | 164.5 | 166.4 | 168.5 | 170.5 | 172.7 |
| Coefficient of Performance (COP) | | 2.88 | 2.89 | 2.88 | 2.88 | 2.87 | 2.87 | 2.86 | 2.86 |
| Discharge temperature | ° C. | 105.5 | 109.9 | 110.7 | 111.5 | 112.3 | 113.2 | 114.0 | 114.8 |
| Mass flow rate | kg/hr | 251 | 237 | 234 | 231 | 229 | 226 | 223 | 220 |
| Volumetric flow rate | m$^3$/hr | 7.28 | 7.07 | 6.97 | 6.87 | 6.78 | 6.69 | 6.61 | 6.53 |
| Volumetric cooling capacity | kJ/m$^3$ | 5226 | 5377 | 5452 | 5533 | 5605 | 5682 | 5753 | 5824 |

|  |  | Nominal composition (weight %) | | | | | | |
| --- | --- | --- | --- | --- | --- | --- | --- | --- |
|  |  | R-1132a | | | | | | |
|  |  | 10 | 10 | 10 | 10 | 10 | 10 | 10 |
|  |  | R-744 | | | | | | |
|  |  | 5 | 5 | 5 | 5 | 5 | 5 | 5 |
|  |  | R-32 | | | | | | |
|  |  | 36 | 38 | 40 | 42 | 44 | 46 | 48 |
|  |  | R-1234yf | | | | | | |
|  | R410A | 49 | 47 | 45 | 43 | 41 | 39 | 37 |
| Suction line pressure drop | Pa/m 163 | 152 | 149 | 145 | 142 | 139 | 136 | 133 |
| Suction line gas density | kg/m$^3$ 34.6 | 33.5 | 33.6 | 33.6 | 33.7 | 33.7 | 33.7 | 33.7 |
| Condenser line gas density | kg/m$^3$ 155.3 | 172.3 | 173.1 | 174.3 | 174.7 | 175.4 | 175.6 | 175.6 |

Example 27 (Ternary Compositions Comprising 4, 5 and 6 Weight % of R-1132a)

| Nominal composition (% mass) | | | | | | | |
| --- | --- | --- | --- | --- | --- | --- | --- |
| R-1132a | 4 | 4 | 4 | 4 | 4 | 4 | 4 |
| R-32 | 36 | 38 | 40 | 42 | 44 | 46 | 48 |
| R-1234yf | 60 | 58 | 56 | 54 | 52 | 50 | 48 |
| Worst-Case Formulation (% mass) | | | | | | | |
| R-1132a | 4.5 | 4.5 | 4.5 | 4.5 | 4.5 | 4.5 | 4.5 |
| R-32 | 35 | 37 | 39 | 41 | 43 | 45 | 47 |
| R-1234yf | 60.5 | 58.5 | 56.5 | 54.5 | 52.5 | 50.5 | 48.5 |
| Worst-Case Flammable Formulation (% volume) | | | | | | | |
| R-1132a | 22.8% | 22.2% | 21.7% | 21.1% | 20.6% | 20.0% | 19.6% |
| R-32 | 59.9% | 61.6% | 63.2% | 64.7% | 66.1% | 67.5% | 68.8% |
| R-1234yf | 17.3% | 16.2% | 15.2% | 14.2% | 13.3% | 12.4% | 11.6% |
| Nominal composition (% mass) | | | | | | | |
| R-1132a | 5 | 5 | 5 | 5 | 5 | 5 | 5 |
| R-32 | 36 | 38 | 40 | 42 | 44 | 46 | 48 |
| R-1234yf | 59 | 57 | 55 | 53 | 51 | 49 | 47 |
| Worst-Case Formulation (% mass) | | | | | | | |
| R-1132a | 5.5 | 5.5 | 5.5 | 5.5 | 5.5 | 5.5 | 5.5 |
| R-32 | 35 | 37 | 39 | 41 | 43 | 45 | 47 |
| R-1234yf | 59.5 | 57.5 | 55.5 | 53.5 | 51.5 | 49.5 | 47.5 |
| Worst-Case Flammable Formulation (% volume) | | | | | | | |
| R-1132a | 26.6% | 25.9% | 25.3% | 24.6% | 24.0% | 23.5% | 23.0% |
| R-32 | 57.2% | 58.9% | 60.5% | 62.0% | 63.4% | 64.8% | 66.1% |
| R-1234yf | 16.2% | 15.2% | 14.3% | 13.4% | 12.5% | 11.7% | 10.9% |
| Nominal composition (% mass) | | | | | | | |
| R-1132a | 6 | 6 | 6 | 6 | 6 | 6 | 6 |
| R-32 | 36 | 38 | 40 | 42 | 44 | 46 | 48 |
| R-1234yf | 58 | 56 | 54 | 52 | 50 | 48 | 46 |
| Worst-Case Formulation (% mass) | | | | | | | |
| R-1132a | 6.5 | 6.5 | 6.5 | 6.5 | 6.5 | 6.5 | 6.5 |
| R-32 | 35 | 37 | 39 | 41 | 43 | 45 | 47 |
| R-1234yf | 58.5 | 56.5 | 54.5 | 52.5 | 50.5 | 48.5 | 46.5 |
| Worst-Case Flammable Formulation (% volume) | | | | | | | |
| R-1132a | 30.1% | 29.3% | 28.6% | 28.0% | 27.2% | 26.7% | 26.1% |
| R-32 | 54.7% | 56.4% | 58.0% | 59.5% | 61.0% | 62.3% | 63.6% |
| R-1234yf | 15.3% | 14.3% | 13.4% | 12.6% | 11.8% | 11.0% | 10.3% |

Example 28 (Ternary Compositions Comprising 7 and 8 Weight % of R-1132a)

| Nominal composition (% mass) | | | | | | | |
|---|---|---|---|---|---|---|---|
| R-1132a | 7 | 7 | 7 | 7 | 7 | 7 | 7 |
| R-32 | 36 | 38 | 40 | 42 | 44 | 46 | 48 |
| R-1234yf | 57 | 55 | 53 | 51 | 49 | 47 | 45 |
| Worst-Case Formulation (% mass) | | | | | | | |
| R-1132a | 7.5 | 7.5 | 7.5 | 7.5 | 7.5 | 7.5 | 7.5 |
| R-32 | 35 | 37 | 39 | 41 | 43 | 45 | 47 |
| R-1234yf | 57.5 | 55.5 | 53.5 | 51.5 | 49.5 | 47.5 | 45.5 |
| Worst-Case Flammable Formulation (% volume) | | | | | | | |
| R-1132a | 33.2% | 32.3% | 31.6% | 30.9% | 30.3% | 29.6% | 29.0% |
| R-32 | 52.5% | 54.1% | 55.7% | 57.2% | 58.7% | 60.0% | 61.3% |
| R-1234yf | 14.4% | 13.5% | 12.7% | 11.9% | 11.1% | 10.4% | 9.7% |
| Nominal composition (% mass) | | | | | | | |
| R-1132a | 8 | 8 | 8 | 8 | 8 | 8 | 8 |
| R-32 | 36 | 38 | 40 | 42 | 44 | 46 | 48 |
| R-1234yf | 56 | 54 | 52 | 50 | 48 | 46 | 44 |
| Worst-Case Formulation (% mass) | | | | | | | |
| R-1132a | 8.5 | 8.5 | 8.5 | 8.5 | 8.5 | 8.5 | 8.5 |
| R-32 | 35 | 37 | 39 | 41 | 43 | 45 | 47 |
| R-1234yf | 56.5 | 54.5 | 52.5 | 50.5 | 48.5 | 46.5 | 44.5 |
| Worst-Case Flammable Formulation (% volume) | | | | | | | |
| R-1132a | 36.1% | 35.3% | 34.4% | 33.8% | 33.0% | 32.3% | 31.7% |
| R-32 | 50.4% | 52.0% | 53.6% | 55.1% | 56.5% | 57.9% | 59.2% |
| R-1234yf | 13.6% | 12.7% | 11.9% | 11.2% | 10.5% | 9.8% | 9.1% |

Example 29 (Quaternary Compositions Comprising 3 Weight % $CO_2$)

| Nominal composition (% mass) | | | | | | | |
|---|---|---|---|---|---|---|---|
| R-1132a | 4 | 4 | 4 | 4 | 4 | 4 | 4 |
| R-744 | 3 | 3 | 3 | 3 | 3 | 3 | 3 |
| R-32 | 36 | 38 | 40 | 42 | 44 | 46 | 48 |
| R-1234yf | 57 | 55 | 53 | 51 | 49 | 47 | 45 |
| Worst-Case Formulation (% mass) | | | | | | | |
| R-1132a | 4.5 | 4.5 | 4.5 | 4.5 | 4.5 | 4.5 | 4.5 |
| R-744 | 2.5 | 2.5 | 2.5 | 2.5 | 2.5 | 2.5 | 2.5 |
| R-32 | 35 | 37 | 39 | 41 | 43 | 45 | 47 |
| R-1234yf | 58 | 56 | 54 | 52 | 50 | 48 | 46 |
| Worst-Case Flammable Formulation (% volume) | | | | | | | |
| R-1132a | 18.2% | 17.8% | 17.4% | 17.0% | 16.6% | 16.3% | 16.0% |
| R-744 | 20.5% | 20.2% | 19.8% | 19.5% | 19.2% | 18.9% | 18.6% |
| R-32 | 48.1% | 49.7% | 51.2% | 52.6% | 54.0% | 55.3% | 56.5% |
| R-1234yf | 13.1% | 12.3% | 11.6% | 10.9% | 10.2% | 9.5% | 8.9% |
| Nominal composition (% mass) | | | | | | | |
| R-1132a | 5 | 5 | 5 | 5 | 5 | 5 | 5 |
| R-744 | 3 | 3 | 3 | 3 | 3 | 3 | 3 |
| R-32 | 36 | 38 | 40 | 42 | 44 | 46 | 48 |
| R-1234yf | 56 | 54 | 52 | 50 | 48 | 46 | 44 |
| Worst-Case Formulation (% mass) | | | | | | | |
| R-1132a | 5.5 | 5.5 | 5.5 | 5.5 | 5.5 | 5.5 | 5.5 |
| R-744 | 2.5 | 2.5 | 2.5 | 2.5 | 2.5 | 2.5 | 2.5 |
| R-32 | 35 | 37 | 39 | 41 | 43 | 45 | 47 |
| R-1234yf | 57 | 55 | 53 | 51 | 49 | 47 | 45 |
| Worst-Case Flammable Formulation (% volume) | | | | | | | |
| R-1132a | 21.4% | 20.9% | 20.5% | 20.1% | 19.6% | 19.2% | 18.8% |
| R-744 | 19.7% | 19.4% | 19.1% | 18.8% | 18.6% | 18.3% | 18.0% |
| R-32 | 46.4% | 47.9% | 49.4% | 50.8% | 52.2% | 53.5% | 54.7% |
| R-1234yf | 12.4% | 11.7% | 11.0% | 10.3% | 9.6% | 9.0% | 8.4% |

Example 30 (Quaternary Compositions Comprising 3 Weight % CO$_2$)

| Nominal composition (% mass) | | | | | | | |
|---|---|---|---|---|---|---|---|
| R-1132a | 6 | 6 | 6 | 6 | 6 | 6 | 6 |
| R-744 | 3 | 3 | 3 | 3 | 3 | 3 | 3 |
| R-32 | 36 | 38 | 40 | 42 | 44 | 46 | 48 |
| R-1234yf | 55 | 53 | 51 | 49 | 47 | 45 | 43 |
| Worst-Case Formulation (% mass) | | | | | | | |
| R-1132a | 6.5 | 6.5 | 6.5 | 6.5 | 6.5 | 6.5 | 6.5 |
| R-744 | 2.5 | 2.5 | 2.5 | 2.5 | 2.5 | 2.5 | 2.5 |
| R-32 | 35 | 37 | 39 | 41 | 43 | 45 | 47 |
| R-1234yf | 56 | 54 | 52 | 50 | 48 | 46 | 44 |
| Worst-Case Flammable Formulation (% volume) | | | | | | | |
| R-1132a | 24.4% | 23.9% | 23.4% | 22.9% | 22.4% | 22.0% | 21.5% |
| R-744 | 19.0% | 18.8% | 18.5% | 18.2% | 18.0% | 17.7% | 17.5% |
| R-32 | 44.8% | 46.3% | 47.8% | 49.2% | 50.5% | 51.8% | 53.0% |
| R-1234yf | 11.8% | 11.1% | 10.4% | 9.8% | 9.1% | 8.6% | 8.0% |
| Nominal composition (% mass) | | | | | | | |
| R-1132a | 7 | 7 | 7 | 7 | 7 | 7 | 7 |
| R-744 | 3 | 3 | 3 | 3 | 3 | 3 | 3 |
| R-32 | 36 | 38 | 40 | 42 | 44 | 46 | 48 |
| R-1234yf | 54 | 52 | 50 | 48 | 46 | 44 | 42 |
| Worst-Case Formulation (% mass) | | | | | | | |
| R-1132a | 7.5 | 7.5 | 7.5 | 7.5 | 7.5 | 7.5 | 7.5 |
| R-744 | 2.5 | 2.5 | 2.5 | 2.5 | 2.5 | 2.5 | 2.5 |
| R-32 | 35 | 37 | 39 | 41 | 43 | 45 | 47 |
| R-1234yf | 55 | 53 | 51 | 49 | 47 | 45 | 43 |
| Worst-Case Flammable Formulation (% volume) | | | | | | | |
| R-1132a | 27.2% | 26.6% | 26.1% | 25.5% | 25.0% | 24.5% | 24.1% |
| R-744 | 18.4% | 18.1% | 17.9% | 17.6% | 17.4% | 17.2% | 17.0% |
| R-32 | 43.3% | 44.8% | 46.2% | 47.6% | 48.9% | 50.2% | 51.4% |
| R-1234yf | 11.2% | 10.5% | 9.9% | 9.3% | 8.7% | 8.1% | 7.6% |

Example 31 (Quaternary Compositions Comprising 3 Weight % CO$_2$)

| Nominal composition (% mass) | | | | | | | |
|---|---|---|---|---|---|---|---|
| R-1132a | 8 | 8 | 8 | 8 | 8 | 8 | 8 |
| R-744 | 3 | 3 | 3 | 3 | 3 | 3 | 3 |
| R-32 | 36 | 38 | 40 | 42 | 44 | 46 | 48 |
| R-1234yf | 53 | 51 | 49 | 47 | 45 | 43 | 41 |
| Worst-Case Formulation (% mass) | | | | | | | |
| R-1132a | 8.5 | 8.5 | 8.5 | 8.5 | 8.5 | 8.5 | 8.5 |
| R-744 | 2.5 | 2.5 | 2.5 | 2.5 | 2.5 | 2.5 | 2.5 |
| R-32 | 35 | 37 | 39 | 41 | 43 | 45 | 47 |
| R-1234yf | 54 | 52 | 50 | 48 | 46 | 44 | 42 |
| Worst-Case Flammable Formulation (% volume) | | | | | | | |
| R-1132a | 29.7% | 29.1% | 28.6% | 28.0% | 27.5% | 27.0% | 26.5% |
| R-744 | 17.8% | 17.6% | 17.3% | 17.1% | 16.9% | 16.7% | 16.5% |
| R-32 | 41.9% | 43.4% | 44.8% | 46.2% | 47.5% | 48.7% | 49.9% |
| R-1234yf | 10.6% | 10.0% | 9.4% | 8.8% | 8.2% | 7.7% | 7.2% |
| Nominal composition (% mass) | | | | | | | |
| R-1132a | 9 | 9 | 9 | 9 | 9 | 9 | 9 |
| R-744 | 3 | 3 | 3 | 3 | 3 | 3 | 3 |
| R-32 | 36 | 38 | 40 | 42 | 44 | 46 | 48 |
| R-1234yf | 52 | 50 | 48 | 46 | 44 | 42 | 40 |
| Worst-Case Formulation (% mass) | | | | | | | |
| R-1132a | 9.5 | 9.5 | 9.5 | 9.5 | 9.5 | 9.5 | 9.5 |
| R-744 | 2.5 | 2.5 | 2.5 | 2.5 | 2.5 | 2.5 | 2.5 |
| R-32 | 35 | 37 | 39 | 41 | 43 | 45 | 47 |
| R-1234yf | 53 | 51 | 49 | 47 | 45 | 43 | 41 |

-continued

| | Worst-Case Flammable Formulation (% volume) | | | | | | |
|---|---|---|---|---|---|---|---|
| R-1132a | 32.1% | 31.5% | 30.9% | 30.3% | 29.7% | 29.2% | 28.7% |
| R-744 | 17.2% | 17.0% | 16.8% | 16.5% | 16.3% | 16.1% | 16.0% |
| R-32 | 40.6% | 42.1% | 43.4% | 44.8% | 46.1% | 47.3% | 48.5% |
| R-1234yf | 10.1% | 9.5% | 8.9% | 8.3% | 7.8% | 7.3% | 6.8% |

Example 32 (Quaternary Compositions Comprising 3 Weight % $CO_2$)

| | Nominal composition (% mass) | | | | | | |
|---|---|---|---|---|---|---|---|
| R-1132a | 10 | 10 | 10 | 10 | 10 | 10 | 10 |
| R-744 | 3 | 3 | 3 | 3 | 3 | 3 | 3 |
| R-32 | 36 | 38 | 40 | 42 | 44 | 46 | 48 |
| R-1234yf | 51 | 49 | 47 | 45 | 43 | 41 | 39 |
| | Worst-Case Formulation (% mass) | | | | | | |
| R-1132a | 10.5 | 10.5 | 10.5 | 10.5 | 10.5 | 10.5 | 10.5 |
| R-744 | 2.5 | 2.5 | 2.5 | 2.5 | 2.5 | 2.5 | 2.5 |
| R-32 | 35 | 37 | 39 | 41 | 43 | 45 | 47 |
| R-1234yf | 52 | 50 | 48 | 46 | 44 | 42 | 40 |
| | Worst-Case Flammable Formulation (% volume) | | | | | | |
| R-1132a | 34.4% | 33.7% | 33.1% | 32.5% | 31.9% | 31.3% | 30.8% |
| R-744 | 16.7% | 16.5% | 16.3% | 16.1% | 15.9% | 15.7% | 15.6% |
| R-32 | 39.3% | 40.8% | 42.2% | 43.5% | 44.8% | 46.0% | 47.2% |
| R-1234yf | 9.6% | 9.0% | 8.4% | 7.9% | 7.4% | 6.9% | 6.4% |

Example 33 (Quaternary Compositions Comprising 4 weight % $CO_2$ (R-744))

| | Nominal composition (% mass) | | | | | | |
|---|---|---|---|---|---|---|---|
| R-1132a | 4 | 4 | 4 | 4 | 4 | 4 | 4 |
| R-744 | 4 | 4 | 4 | 4 | 4 | 4 | 4 |
| R-32 | 36 | 38 | 40 | 42 | 44 | 46 | 48 |
| R-1234yf | 56 | 54 | 52 | 50 | 48 | 46 | 44 |
| | Worst-Case Formulation (% mass) | | | | | | |
| R-1132a | 4.5 | 4.5 | 4.5 | 4.5 | 4.5 | 4.5 | 4.5 |
| R-744 | 3.5 | 3.5 | 3.5 | 3.5 | 3.5 | 3.5 | 3.5 |
| R-32 | 35 | 37 | 39 | 41 | 43 | 45 | 47 |
| R-1234yf | 57 | 55 | 53 | 51 | 49 | 47 | 45 |
| | Worst-Case Flammable Formulation (% volume) | | | | | | |
| R-1132a | 16.8% | 16.5% | 16.1% | 15.8% | 15.4% | 15.1% | 14.8% |
| R-744 | 26.6% | 26.2% | 25.8% | 25.4% | 25.1% | 24.7% | 24.4% |
| R-32 | 44.6% | 46.1% | 47.6% | 48.9% | 50.3% | 51.5% | 52.7% |
| R-1234yf | 11.9% | 11.2% | 10.5% | 9.9% | 9.2% | 8.7% | 8.1% |

Example 34 (Quaternary Compositions Comprising 4 Weight % $CO_2$)

| | Nominal composition (% mass) | | | | | | |
|---|---|---|---|---|---|---|---|
| R-1132a | 5 | 5 | 5 | 5 | 5 | 5 | 5 |
| R-744 | 4 | 4 | 4 | 4 | 4 | 4 | 4 |
| R-32 | 36 | 38 | 40 | 42 | 44 | 46 | 48 |
| R-1234yf | 55 | 53 | 51 | 49 | 47 | 45 | 43 |
| | Worst-Case Formulation (% mass) | | | | | | |
| R-1132a | 5.5 | 5.5 | 5.5 | 5.5 | 5.5 | 5.5 | 5.5 |
| R-744 | 3.5 | 3.5 | 3.5 | 3.5 | 3.5 | 3.5 | 3.5 |
| R-32 | 35 | 37 | 39 | 41 | 43 | 45 | 47 |
| R-1234yf | 56 | 54 | 52 | 50 | 48 | 46 | 44 |

-continued

| | | | | | | | |
|---|---|---|---|---|---|---|---|
| | Worst-Case Flammable Formulation (% volume) |
| R-1132a | 19.9% | 19.4% | 19.0% | 18.6% | 18.3% | 17.9% | 17.6% |
| R-744 | 25.7% | 25.3% | 25.0% | 24.6% | 24.3% | 23.9% | 23.6% |
| R-32 | 43.2% | 44.6% | 46.0% | 47.4% | 48.7% | 50.0% | 51.2% |
| R-1234yf | 11.3% | 10.6% | 10.0% | 9.4% | 8.8% | 8.2% | 7.7% |
| | Nominal composition (% mass) |
| R-1132a | 6 | 6 | 6 | 6 | 6 | 6 | 6 |
| R-744 | 4 | 4 | 4 | 4 | 4 | 4 | 4 |
| R-32 | 36 | 38 | 40 | 42 | 44 | 46 | 48 |
| R-1234yf | 54 | 52 | 50 | 48 | 46 | 44 | 42 |
| | Worst-Case Formulation (% mass) |
| R-1132a | 6.5 | 6.5 | 6.5 | 6.5 | 6.5 | 6.5 | 6.5 |
| R-744 | 3.5 | 3.5 | 3.5 | 3.5 | 3.5 | 3.5 | 3.5 |
| R-32 | 35 | 37 | 39 | 41 | 43 | 45 | 47 |
| R-1234yf | 55 | 53 | 51 | 49 | 47 | 45 | 43 |
| | Worst-Case Flammable Formulation (% volume) |
| R-1132a | 22.7% | 22.2% | 21.8% | 21.3% | 20.9% | 20.5% | 20.1% |
| R-744 | 24.9% | 24.5% | 24.2% | 23.9% | 23.5% | 23.2% | 22.9% |
| R-32 | 41.8% | 43.2% | 44.6% | 46.0% | 47.3% | 48.5% | 49.7% |
| R-1234yf | 10.7% | 10.1% | 9.5% | 8.9% | 8.3% | 7.8% | 7.3% |

Example 35 (Quaternary Compositions Comprising 4 Weight % $CO_2$)

| | | | | | | | |
|---|---|---|---|---|---|---|---|
| | Nominal composition (% mass) |
| R-1132a | 7 | 7 | 7 | 7 | 7 | 7 | 7 |
| R-744 | 4 | 4 | 4 | 4 | 4 | 4 | 4 |
| R-32 | 36 | 38 | 40 | 42 | 44 | 46 | 48 |
| R-1234yf | 53 | 51 | 49 | 47 | 45 | 43 | 41 |
| | Worst-Case Formulation (% mass) |
| R-1132a | 7.5 | 7.5 | 7.5 | 7.5 | 7.5 | 7.5 | 7.5 |
| R-744 | 3.5 | 3.5 | 3.5 | 3.5 | 3.5 | 3.5 | 3.5 |
| R-32 | 35 | 37 | 39 | 41 | 43 | 45 | 47 |
| R-1234yf | 54 | 52 | 50 | 48 | 46 | 44 | 42 |
| | Worst-Case Flammable Formulation (% volume) |
| R-1132a | 25.3% | 24.8% | 24.3% | 23.8% | 23.4% | 23.0% | 22.5% |
| R-744 | 24.1% | 23.8% | 23.4% | 23.1% | 22.8% | 22.6% | 22.3% |
| R-32 | 40.5% | 41.9% | 43.3% | 44.6% | 45.9% | 47.1% | 48.3% |
| R-1234yf | 10.2% | 9.6% | 9.0% | 8.4% | 7.9% | 7.4% | 6.9% |
| | Nominal composition (% mass) |
| R-1132a | 8 | 8 | 8 | 8 | 8 | 8 | 8 |
| R-744 | 4 | 4 | 4 | 4 | 4 | 4 | 4 |
| R-32 | 36 | 38 | 40 | 42 | 44 | 46 | 48 |
| R-1234yf | 52 | 50 | 48 | 46 | 44 | 42 | 40 |
| | Worst-Case Formulation (% mass) |
| R-1132a | 8.5 | 8.5 | 8.5 | 8.5 | 8.5 | 8.5 | 8.5 |
| R-744 | 3.5 | 3.5 | 3.5 | 3.5 | 3.5 | 3.5 | 3.5 |
| R-32 | 35 | 37 | 39 | 41 | 43 | 45 | 47 |
| R-1234yf | 53 | 51 | 49 | 47 | 45 | 43 | 41 |
| | Worst-Case Flammable Formulation (% volume) |
| R-1132a | 27.8% | 27.2% | 26.7% | 26.2% | 25.7% | 25.2% | 24.8% |
| R-744 | 23.3% | 23.0% | 22.7% | 22.5% | 22.1% | 21.9% | 21.6% |
| R-32 | 39.2% | 40.7% | 42.0% | 43.3% | 44.6% | 45.8% | 47.0% |
| R-1234yf | 9.7% | 9.1% | 8.6% | 8.0% | 7.5% | 7.0% | 6.6% |

Example 36 (Quaternary Compositions Comprising 4 Weight % $CO_2$)

| Nominal composition (% mass) | | | | | | | |
|---|---|---|---|---|---|---|---|
| R-1132a | 9 | 9 | 9 | 9 | 9 | 9 | 9 |
| R-744 | 4 | 4 | 4 | 4 | 4 | 4 | 4 |
| R-32 | 36 | 38 | 40 | 42 | 44 | 46 | 48 |
| R-1234yf | 51 | 49 | 47 | 45 | 43 | 41 | 39 |
| Worst-Case Formulation (% mass) | | | | | | | |
| R-1132a | 9.5 | 9.5 | 9.5 | 9.5 | 9.5 | 9.5 | 9.5 |
| R-744 | 3.5 | 3.5 | 3.5 | 3.5 | 3.5 | 3.5 | 3.5 |
| R-32 | 35 | 37 | 39 | 41 | 43 | 45 | 47 |
| R-1234yf | 52 | 50 | 48 | 46 | 44 | 42 | 40 |
| Worst-Case Flammable Formulation (% volume) | | | | | | | |
| R-1132a | 30.1% | 29.5% | 29.0% | 28.4% | 27.9% | 27.4% | 26.9% |
| R-744 | 22.7% | 22.3% | 22.1% | 21.8% | 21.6% | 21.3% | 21.1% |
| R-32 | 38.1% | 39.5% | 40.8% | 42.1% | 43.4% | 44.6% | 45.7% |
| R-1234yf | 9.2% | 8.7% | 8.1% | 7.6% | 7.1% | 6.7% | 6.2% |
| Nominal composition (% mass) | | | | | | | |
| R-1132a | 10 | 10 | 10 | 10 | 10 | 10 | 10 |
| R-744 | 4 | 4 | 4 | 4 | 4 | 4 | 4 |
| R-32 | 36 | 38 | 40 | 42 | 44 | 46 | 48 |
| R-1234yf | 50 | 48 | 46 | 44 | 42 | 40 | 38 |
| Worst-Case Formulation (% mass) | | | | | | | |
| R-1132a | 10.5 | 10.5 | 10.5 | 10.5 | 10.5 | 10.5 | 10.5 |
| R-744 | 3.5 | 3.5 | 3.5 | 3.5 | 3.5 | 3.5 | 3.5 |
| R-32 | 35 | 37 | 39 | 41 | 43 | 45 | 47 |
| R-1234yf | 51 | 49 | 47 | 45 | 43 | 41 | 39 |
| Worst-Case Flammable Formulation (% volume) | | | | | | | |
| R-1132a | 32.3% | 31.6% | 31.1% | 30.6% | 30.0% | 29.5% | 29.0% |
| R-744 | 22.0% | 21.7% | 21.5% | 21.3% | 21.0% | 20.8% | 20.5% |
| R-32 | 37.0% | 38.4% | 39.7% | 41.0% | 42.2% | 43.4% | 44.6% |
| R-1234yf | 8.8% | 8.3% | 7.7% | 7.3% | 6.8% | 6.3% | 5.9% |

Example 37 (Quaternary Compositions Comprising 5 Weight % $CO_2$)

| Nominal composition (% mass) | | | | | | | |
|---|---|---|---|---|---|---|---|
| R-1132a | 4 | 4 | 4 | 4 | 4 | 4 | 4 |
| R-744 | 5 | 5 | 5 | 5 | 5 | 5 | 5 |
| R-32 | 36 | 38 | 40 | 42 | 44 | 46 | 48 |
| R-1234yf | 55 | 53 | 51 | 49 | 47 | 45 | 43 |
| Worst-Case Formulation (% mass) | | | | | | | |
| R-1132a | 4.5 | 4.5 | 4.5 | 4.5 | 4.5 | 4.5 | 4.5 |
| R-744 | 4.5 | 4.5 | 4.5 | 4.5 | 4.5 | 4.5 | 4.5 |
| R-32 | 35 | 37 | 39 | 41 | 43 | 45 | 47 |
| R-1234yf | 56 | 54 | 52 | 50 | 48 | 46 | 44 |
| Worst-Case Flammable Formulation (% volume) | | | | | | | |
| R-1132a | 15.6% | 15.3% | 15.0% | 14.7% | 14.4% | 14.1% | 13.9% |
| R-744 | 31.9% | 31.4% | 31.0% | 30.6% | 30.2% | 29.8% | 29.4% |
| R-32 | 41.6% | 43.1% | 44.4% | 45.8% | 47.0% | 48.2% | 49.4% |
| R-1234yf | 10.8% | 10.2% | 9.6% | 9.0% | 8.4% | 7.9% | 7.4% |
| Nominal composition (% mass) | | | | | | | |
| R-1132a | 5 | 5 | 5 | 5 | 5 | 5 | 5 |
| R-744 | 5 | 5 | 5 | 5 | 5 | 5 | 5 |
| R-32 | 36 | 38 | 40 | 42 | 44 | 46 | 48 |
| R-1234yf | 54 | 52 | 50 | 48 | 46 | 44 | 42 |
| Worst-Case Formulation (% mass) | | | | | | | |
| R-1132a | 5.5 | 5.5 | 5.5 | 5.5 | 5.5 | 5.5 | 5.5 |
| R-744 | 4.5 | 4.5 | 4.5 | 4.5 | 4.5 | 4.5 | 4.5 |
| R-32 | 35 | 37 | 39 | 41 | 43 | 45 | 47 |
| R-1234yf | 55 | 53 | 51 | 49 | 47 | 45 | 43 |

-continued

| Worst-Case Flammable Formulation (% volume) | | | | | | |
|---|---|---|---|---|---|---|
| R-1132a | 18.5% | 18.1% | 17.8% | 17.4% | 17.1% | 16.8% | 16.4% |
| R-744 | 30.9% | 30.5% | 30.1% | 29.7% | 29.3% | 28.9% | 28.5% |
| R-32 | 40.3% | 41.7% | 43.1% | 44.4% | 45.7% | 46.9% | 48.0% |
| R-1234yf | 10.3% | 9.7% | 9.1% | 8.5% | 8.0% | 7.5% | 7.0% |

Example 38 (Quaternary Compositions Comprising 5 Weight % $CO_2$)

| Nominal composition (% mass) | | | | | | |
|---|---|---|---|---|---|---|
| R-1132a | 6 | 6 | 6 | 6 | 6 | 6 | 6 |
| R-744 | 5 | 5 | 5 | 5 | 5 | 5 | 5 |
| R-32 | 36 | 38 | 40 | 42 | 44 | 46 | 48 |
| R-1234yf | 53 | 51 | 49 | 47 | 45 | 43 | 41 |
| Worst-Case Formulation (% mass) | | | | | | |
| R-1132a | 6.5 | 6.5 | 6.5 | 6.5 | 6.5 | 6.5 | 6.5 |
| R-744 | 4.5 | 4.5 | 4.5 | 4.5 | 4.5 | 4.5 | 4.5 |
| R-32 | 35 | 37 | 39 | 41 | 43 | 45 | 47 |
| R-1234yf | 54 | 52 | 50 | 48 | 46 | 44 | 42 |
| Worst-Case Flammable Formulation (% volume) | | | | | | |
| R-1132a | 21.2% | 20.7% | 20.3% | 20.0% | 19.6% | 19.2% | 18.9% |
| R-744 | 29.9% | 29.5% | 29.2% | 28.8% | 28.4% | 28.1% | 27.8% |
| R-32 | 39.1% | 40.5% | 41.9% | 43.2% | 44.4% | 45.6% | 46.7% |
| R-1234yf | 9.8% | 9.2% | 8.7% | 8.1% | 7.6% | 7.1% | 6.6% |
| Nominal composition (% mass) | | | | | | |
| R-1132a | 7 | 7 | 7 | 7 | 7 | 7 | 7 |
| R-744 | 5 | 5 | 5 | 5 | 5 | 5 | 5 |
| R-32 | 36 | 38 | 40 | 42 | 44 | 46 | 48 |
| R-1234yf | 52 | 50 | 48 | 46 | 44 | 42 | 40 |
| Worst-Case Formulation (% mass) | | | | | | |
| R-1132a | 7.5 | 7.5 | 7.5 | 7.5 | 7.5 | 7.5 | 7.5 |
| R-744 | 4.5 | 4.5 | 4.5 | 4.5 | 4.5 | 4.5 | 4.5 |
| R-32 | 35 | 37 | 39 | 41 | 43 | 45 | 47 |
| R-1234yf | 53 | 51 | 49 | 47 | 45 | 43 | 41 |
| Worst-Case Flammable Formulation (% volume) | | | | | | |
| R-1132a | 23.7% | 23.2% | 22.8% | 22.4% | 21.9% | 21.6% | 21.2% |
| R-744 | 29.1% | 28.7% | 28.3% | 28.0% | 27.7% | 27.3% | 27.0% |
| R-32 | 38.0% | 39.4% | 40.7% | 42.0% | 43.2% | 44.4% | 45.5% |
| R-1234yf | 9.3% | 8.8% | 8.2% | 7.7% | 7.2% | 6.8% | 6.3% |

Example 39 (Quaternary Compositions Comprising 5 Weight % $CO_2$)

| Nominal composition (% mass) | | | | | | |
|---|---|---|---|---|---|---|
| R-1132a | 8 | 8 | 8 | 8 | 8 | 8 | 8 |
| R-744 | 5 | 5 | 5 | 5 | 5 | 5 | 5 |
| R-32 | 36 | 38 | 40 | 42 | 44 | 46 | 48 |
| R-1234yf | 51 | 49 | 47 | 45 | 43 | 41 | 39 |
| Worst-Case Formulation (% mass) | | | | | | |
| R-1132a | 8.5 | 8.5 | 8.5 | 8.5 | 8.5 | 8.5 | 8.5 |
| R-744 | 4.5 | 4.5 | 4.5 | 4.5 | 4.5 | 4.5 | 4.5 |
| R-32 | 35 | 37 | 39 | 41 | 43 | 45 | 47 |
| R-1234yf | 52 | 50 | 48 | 46 | 44 | 42 | 40 |
| Worst-Case Flammable Formulation (% volume) | | | | | | |
| R-1132a | 26.0% | 25.5% | 25.0% | 24.6% | 24.2% | 23.8% | 23.4% |
| R-744 | 28.1% | 27.9% | 27.5% | 27.2% | 26.9% | 26.6% | 26.3% |
| R-32 | 36.9% | 38.3% | 39.6% | 40.8% | 42.0% | 43.2% | 44.3% |
| R-1234yf | 8.9% | 8.4% | 7.9% | 7.4% | 6.9% | 6.4% | 6.0% |

| Nominal composition (% mass) | | | | | | | |
|---|---|---|---|---|---|---|---|
| R-1132a | 9 | 9 | 9 | 9 | 9 | 9 | 9 |
| R-744 | 5 | 5 | 5 | 5 | 5 | 5 | 5 |
| R-32 | 46 | 46 | 46 | 46 | 46 | 46 | 46 |
| R-1234yf | 40 | 40 | 40 | 40 | 40 | 40 | 40 |
| Worst-Case Formulation (% mass) | | | | | | | |
| R-1132a | 9.5 | 9.5 | 9.5 | 9.5 | 9.5 | 9.5 | 9.5 |
| R-744 | 4.5 | 4.5 | 4.5 | 4.5 | 4.5 | 4.5 | 4.5 |
| R-32 | 45 | 45 | 45 | 45 | 45 | 45 | 45 |
| R-1234yf | 41 | 41 | 41 | 41 | 41 | 41 | 41 |
| Worst-Case Flammable Formulation (% volume) | | | | | | | |
| R-1132a | 25.9% | 25.9% | 25.9% | 25.9% | 25.9% | 25.9% | 25.9% |
| R-744 | 26.0% | 26.0% | 26.0% | 26.0% | 26.0% | 26.0% | 26.0% |
| R-32 | 42.1% | 42.1% | 42.1% | 42.1% | 42.1% | 42.1% | 42.1% |
| R-1234yf | 6.1% | 6.1% | 6.1% | 6.1% | 6.1% | 6.1% | 6.1% |

Example 40 (Quaternary Compositions Comprising 5 Weight % $CO_2$)

| Nominal composition (% mass) | | | | | | | |
|---|---|---|---|---|---|---|---|
| R-1132a | 10 | 10 | 10 | 10 | 10 | 10 | 10 |
| R-744 | 5 | 5 | 5 | 5 | 5 | 5 | 5 |
| R-32 | 46 | 46 | 46 | 46 | 46 | 46 | 46 |
| R-1234yf | 39 | 39 | 39 | 39 | 39 | 39 | 39 |
| Worst-Case Formulation (% mass) | | | | | | | |
| R-1132a | 10.5 | 10.5 | 10.5 | 10.5 | 10.5 | 10.5 | 10.5 |
| R-744 | 4.5 | 4.5 | 4.5 | 4.5 | 4.5 | 4.5 | 4.5 |
| R-32 | 45 | 45 | 45 | 45 | 45 | 45 | 45 |
| R-1234yf | 40 | 40 | 40 | 40 | 40 | 40 | 40 |
| Worst-Case Flammable Formulation (% volume) | | | | | | | |
| R-1132a | 27.8% | 27.8% | 27.8% | 27.8% | 27.8% | 27.8% | 27.8% |
| R-744 | 25.3% | 25.3% | 25.3% | 25.3% | 25.3% | 25.3% | 25.3% |
| R-32 | 41.1% | 41.1% | 41.1% | 41.1% | 41.1% | 41.1% | 41.1% |
| R-1234yf | 5.8% | 5.8% | 5.8% | 5.8% | 5.8% | 5.8% | 5.8% |

The invention claimed is:

1. A composition comprising:
   (a) from about 2 to about 15 weight % of 1,1-difluoroethene (R-1132a);
   (b) from about 20 to about 60 weight % of difluoromethane (R-32);
   (c) from about 25 to about 70 weight % of 2,3,3,3-tetrafluoropropene (R-1234yf); and
   (d) from about 2 to about 12 weight % of carbon dioxide ($CO_2$, R-744);
   based on the total weight of the composition.

2. A composition according to claim 1, wherein the composition comprises:
   (a) from about 4 to about 10 weight % of R-1132a;
   (b) from about 30 to about 48 weight % of R-32;
   (c) from about 34 to about 64 weight % of R-1234yf; and
   (d) from about 2 to about 8 weight % of $CO_2$;
   based on the total weight of the composition.

3. A composition according to claim 1, wherein the composition comprises from about 5 to about 10 weight % of R-1132a based on the total weight of the composition.

4. A composition according to claim 1, wherein the composition comprises from about 5 to about 8 weight % of R-1132a based on the total weight of the composition.

5. A composition according to claim 1, wherein the composition comprises from about 32 to about 44 weight % of R-32 based on the total weight of the composition.

6. A composition according to claim 1, wherein the composition comprises from about 36 to about 40 weight % of R-32 based on the total weight of the composition.

7. A composition according to claim 1, wherein the composition comprises from about 34 to about 60 weight % of R-1234yf based on the total weight of the composition.

8. A composition according to claim 1, wherein the composition comprises from about 43 to about 54 weight % of R-1234yf based on the total weight of the composition.

9. A composition according to claim 1, wherein the composition comprises from about 2 to about 7 weight % of $CO_2$ based on the total weight of the composition.

10. A composition according to claim 1, wherein the composition comprises from about 3 to about 6 weight % of $CO_2$ based on the total weight of the composition.

11. A composition according to claim 1, wherein the composition comprises:
   about 6 weight % R-1132a, about 40 weight % R-32, about 51 weight % R-1234yf and about 3 weight % $CO_2$;
   about 7 weight % R-1132a, about 36 weight % R-32, about 54 weight % R-1234yf and about 3 weight % $CO_2$;
   about 9 weight % R-1132a, about 44 weight % R-32, about 43 weight % R-1234yf and about 4 weight % $CO_2$; or
   about 7 weight % R-1132a, about 30 weight % R-32, about 60 weight % R-1234yf and about 3 weight % $CO_2$;
   based on the total weight of the composition.

12. A composition according to claim 1, wherein the manufacturing tolerances are +1/−0.5 weight % $CO_2$; +0.5/−1 weight % R-1132a; ±1 weight % R-32; and ±2 weight % R-1234yf.

13. A composition according to claim 1, wherein the Worst-Case Formulation for Flammability (WCFF) of the composition in accordance with ASHRAE Standard 34 Appendix B has a molar volume concentration of R-1132a which is less than about 35% v/v or less than about 30% v/v based on the total volume of the composition.

14. A composition according to claim 1 consisting essentially of the stated components.

15. A composition according to claim 1, wherein the composition is less flammable than R-1132a alone, wherein the composition has:
   a. a higher flammable limit
   b. a higher ignition energy; and/or
   c. a lower flame velocity
compared to R-1132a alone.

16. A composition according to claim 1 wherein the composition is non-flammable, wherein the composition is non-flammable from at ambient temperature, up to wherein the composition is non-flammable at 60° C.

17. A composition according to claim 1, wherein the composition has a temperature glide in an evaporator or condenser of less than about 15K, less than about 10K, or less than about 6K.

18. A composition according to claim 1 wherein the composition has a volumetric refrigeration capacity which is within about 15% of that of R-410A, or within about 10% of R-410A.

19. A composition according to claim 1, wherein the operating condenser pressure in a condenser containing the composition is within about 10% of that of the condenser containing R-410A, or within about 5%.

20. A composition according to claim 1, wherein the operating condenser pressure in a condenser containing the composition is lower than that of the condenser containing R-410A.

21. A composition according to claim 1, wherein the composition has a Global Warming Potential (GWP) of less than about 300, or less than about 280.

22. A composition according to claim 1 wherein the composition has a burning velocity of less than about 10 cm/s as measured by ASHRAE Standard 34.

23. A composition comprising a lubricant and a composition according to claim 1, optionally wherein the lubricant is selected from mineral oil, silicone oil, polyalkyl benzenes (PABs), polyol esters (POEs), polyalkylene glycols (PAGs), polyalkylene glycol esters (PAG esters), polyvinyl ethers (PVEs), poly alpha-olefins and combinations thereof, or wherein the lubricant is selected from PAGs or POEs.

24. A composition comprising a stabiliser and a composition according to claim 1, optionally wherein the stabiliser is selected from diene-based compounds, phosphates, phenol compounds and epoxides, and mixtures thereof.

25. A composition comprising a flame retardant and a composition according to claim 1, optionally wherein the flame retardant is selected from the group consisting of tri-(2-chloroethyl)-phosphate, (chloropropyl) phosphate, tri-(2,3-dibromopropyl)-phosphate, tri-(1,3-dichloropropyl)-phosphate, diammonium phosphate, various halogenated aromatic compounds, antimony oxide, aluminium trihydrate, polyvinyl chloride, a fluorinated iodocarbon, a fluorinated bromocarbon, trifluoro iodomethane, perfluoroalkyl amines, bromo-fluoroalkyl amines and mixtures thereof.

26. A heat transfer device containing a composition as defined in claim 1, wherein the heat transfer device comprises a refrigeration device, a residential or commercial air conditioning system, a heat pump or a commercial or industrial refrigeration system.

27. A sprayable composition comprising material to be sprayed and a propellant comprising a composition as defined in claim 1.

28. A method for cooling an article which comprises condensing a composition defined in claim 1 and thereafter evaporating the composition in the vicinity of the article to be cooled.

29. A method for heating an article which comprises condensing a composition as defined in claim 1 in the vicinity of the article to be heated and thereafter evaporating the composition.

30. A method for extracting a substance from biomass comprising contacting biomass with a solvent comprising a composition as defined in claim 1 and separating the substance from the solvent.

31. A method of cleaning an article comprising contacting the article with a solvent comprising a composition as defined in claim 1.

32. A method of extracting a material from an aqueous solution or from a particulate solid matrix comprising contacting the aqueous solution or the particulate solid matrix with a solvent comprising a composition as defined in claim 1 and separating the material from the solvent.

33. A mechanical power generation device containing a composition as defined in claim 1, optionally wherein the mechanical power generating is adapted to use a Rankine Cycle or modification thereof to generate work from heat.

34. A method of retrofitting a heat transfer device comprising the step of removing an existing heat transfer composition, and introducing a composition as defined in claim 1, optionally wherein the heat transfer device is a commercial or industrial refrigeration device, a heat pump, or a residential or commercial air conditioning system.

35. A method for reducing the environmental impact arising from the operation of a product comprising an existing compound or composition, the method comprising replacing at least partially the existing compound or composition with a composition as defined in claim 1, optionally wherein the use of the composition of the invention results in a lower Total Equivalent Warming Impact, and/or a lower Life-Cycle Carbon Production than is attained by use of the existing compound or composition, wherein the method is carried out on a product from the fields of air-conditioning, refrigeration, heat transfer, aerosols or sprayable propellants, gaseous dielectrics, flame suppression, solvents, cleaners, topical anaesthetics, and expansion applications, wherein the product is selected from a heat transfer device, a sprayable composition, a solvent or a mechanical power generation device, or wherein the product is a heat transfer device comprising a residential or commercial air conditioning system, a heat pump or a commercial or industrial refrigeration system.

36. A method according to claim 34 wherein the existing compound or composition is a heat transfer composition, optionally wherein the heat transfer composition is a refrigerant selected from R-410A, R-454B, R-452B and R-32.

37. A composition comprising:
   (a) from about 6 to about 18 weight % of 1,1-difluoroethene (R-1132a);
   (b) from about 20 to about 65 weight % of difluoromethane (R-32); and (c) from about 15 to about 60 weight % of 2,3,3,3-tetrafluoropropene (R-1234A based on the total weight of the composition; and
(d) carbon dioxide ($CO_2$, R-744).

38. A composition according to claim 37 comprising from about 6 to about 15 weight % of R-1132a based on the total weight of the composition.

39. A composition according to claim 37 comprising from about 7 to about 10 weight % of R-1132a based on the total weight of the composition.

40. A composition according to claim 37, wherein the composition comprises from about 6 to about 7 weight % R-1132a.

41. A composition according to claim 37 comprising from about 25 to about 65 weight % of R-32 based on the total weight of the composition.

42. A composition according to claim 37 comprising from about 40 to about 60 weight % of R-32 based on the total weight of the composition.

43. A composition according to claim 37 comprising from about 20 to about 60 weight % of R-1234yf based on the total weight of the composition.

44. A composition according to claim 37 comprising from about 30 to about 55 weight % of R-1234yf based on the total weight of the composition.

45. A composition according to claim 37, wherein the composition has a volumetric cooling capacity that is within about 15% of that of R-410A, or within about 10% of that of R-410A.

46. A composition according to claim 37, wherein the composition has a temperature glide in an evaporator or condenser of less than about 10K, less than about 7K, or less than about 5K.

47. A composition according to claim 37, wherein the operating condenser pressure in a condenser containing the composition is within about 10% of that of the condenser containing R-410A, or within about 5%.

48. A composition according to claim 37, wherein the operating condenser pressure in a condenser containing the composition is lower than of that of the condenser containing R-410A.

49. A composition according to claim 37, wherein the composition has a Global Warming Potential (GWP) of less than about 300, or less than about 280.

50. A composition according to claim 37, wherein the Worst-Case Formulation for Flammability (WCFF) of the composition in accordance with ASHRAE Standard 34 Appendix B has a molar volume concentration of R-1132a which is less than about 35% v/v or less than about 30% v/v based on the total volume of the composition.

51. A composition according to claim 37, wherein the composition has a compressor discharge temperature which is within about 10K of that of R-410A, or within about 5K of that of R-410A.

52. A composition according to claim 37 wherein the manufacturing tolerances of the composition are +0.5/−1 weight % R-1132a; ±1 weight % R-32; and ±1.5 weight % R-1234yf.

53. A method of retrofitting a heat transfer device comprising the step of removing an existing heat transfer composition, and introducing a composition comprising a POE lubricant and a composition according to claim 47 as a replacement for the existing heat transfer composition in a commercial air conditioning system.

54. A method of retrofitting a heat transfer device comprising the step of removing an existing heat transfer composition, and introducing a composition comprising a POE lubricant and a composition according to claim 37 as a replacement for the existing heat transfer composition in a commercial refrigeration system.

55. The method according to claim 53 wherein the existing heat transfer composition is R-410A.

56. A vessel comprising a composition according to claim 37 in an amount of up to about 90% v/v based on the total volume of the vessel, wherein the vessel has a temperature of about −40° C. and wherein the composition comprises R-1132a in a molar volume concentration of less than about 35% v/v, or less than about 30% v/v, based on the total volume of the composition, optionally wherein the vessel is a cylinder.

\* \* \* \* \*